US012497695B2

(12) United States Patent
Neely et al.

(10) Patent No.: US 12,497,695 B2
(45) Date of Patent: Dec. 16, 2025

(54) COATING SYSTEM USING A MECHANICAL PUMP AND A TURBOMOLECULAR PUMP

(71) Applicant: Greatbatch Ltd., Clarence, NY (US)

(72) Inventors: Steven Scott Neely, Louisville, CO (US); Michael Todd Swanson, II, Denver, CO (US); Bradford Alan Gillette, Broomfield, CO (US); Brian J. Behne, Erie, CO (US)

(73) Assignee: Integer VSi Technologies LLC, Clarence, NY (US)

( * ) Notice: Subject to any disclaimer, the term of this patent is extended or adjusted under 35 U.S.C. 154(b) by 0 days.

(21) Appl. No.: 17/981,935

(22) Filed: Nov. 7, 2022

(65) Prior Publication Data

US 2023/0140950 A1 May 11, 2023

Related U.S. Application Data

(60) Provisional application No. 63/277,000, filed on Nov. 8, 2021.

(51) Int. Cl.
| | |
|---|---|
| *C23C 16/455* | (2006.01) |
| *B05D 1/00* | (2006.01) |
| *C23C 16/44* | (2006.01) |
| *C23C 16/448* | (2006.01) |
| *C23C 16/52* | (2006.01) |

(52) U.S. Cl.
CPC .......... *C23C 16/45561* (2013.01); *B05D 1/60* (2013.01); *C23C 16/4412* (2013.01); *C23C 16/448* (2013.01); *C23C 16/52* (2013.01)

(58) Field of Classification Search
USPC ....... 118/719, 427, 726, 729, 683, 692, 695, 118/956
See application file for complete search history.

(56) References Cited

U.S. PATENT DOCUMENTS

| | | |
|---|---|---|
| 4,945,856 A | 8/1990 | Stewart |
| 5,264,039 A | 11/1993 | Gobush et al. |
| 5,534,068 A | 7/1996 | Beach et al. |

(Continued)

FOREIGN PATENT DOCUMENTS

| | | | |
|---|---|---|---|
| CN | 101922437 A | * | 12/2010 |
| EP | 2828004 B1 | | 11/2019 |

OTHER PUBLICATIONS

English Translation CN-101922437-A (Year: 2010).*

*Primary Examiner* — Yewebdar T Tadesse
(74) *Attorney, Agent, or Firm* — NOD Law PC

(57) ABSTRACT

A coating system for parylene deposition may include a chamber, a pumping system having a first and a second pump, where a pumping speed of the first and second pumps is based at least in part on an operating pressure; and a controller, the controller configured by machine-readable instructions to control activation of the first pump to initiate a pump down operation of the chamber, determine a cut-in pressure for switching operation from the first to the second pump, monitor an internal pressure of the chamber, switch operation to the second pump based at least in part on determining that the internal pressure of the chamber is at or below the cut-in pressure; and continue, using the second pump, the pump down operation of the deposition chamber until the internal pressure is at or below a target pressure for parylene deposition.

13 Claims, 15 Drawing Sheets

(56) References Cited

U.S. PATENT DOCUMENTS

| | | | |
|---|---|---|---|
| 6,709,715 B1* | 3/2004 | Lang | H01L 21/3122 |
| | | | 438/789 |
| 2008/0223409 A1* | 9/2008 | Horsky | H01J 37/304 |
| | | | 134/166 R |
| 2009/0263641 A1 | 10/2009 | Martin, III et al. | |
| 2020/0208258 A1 | 7/2020 | Sorenson et al. | |

* cited by examiner

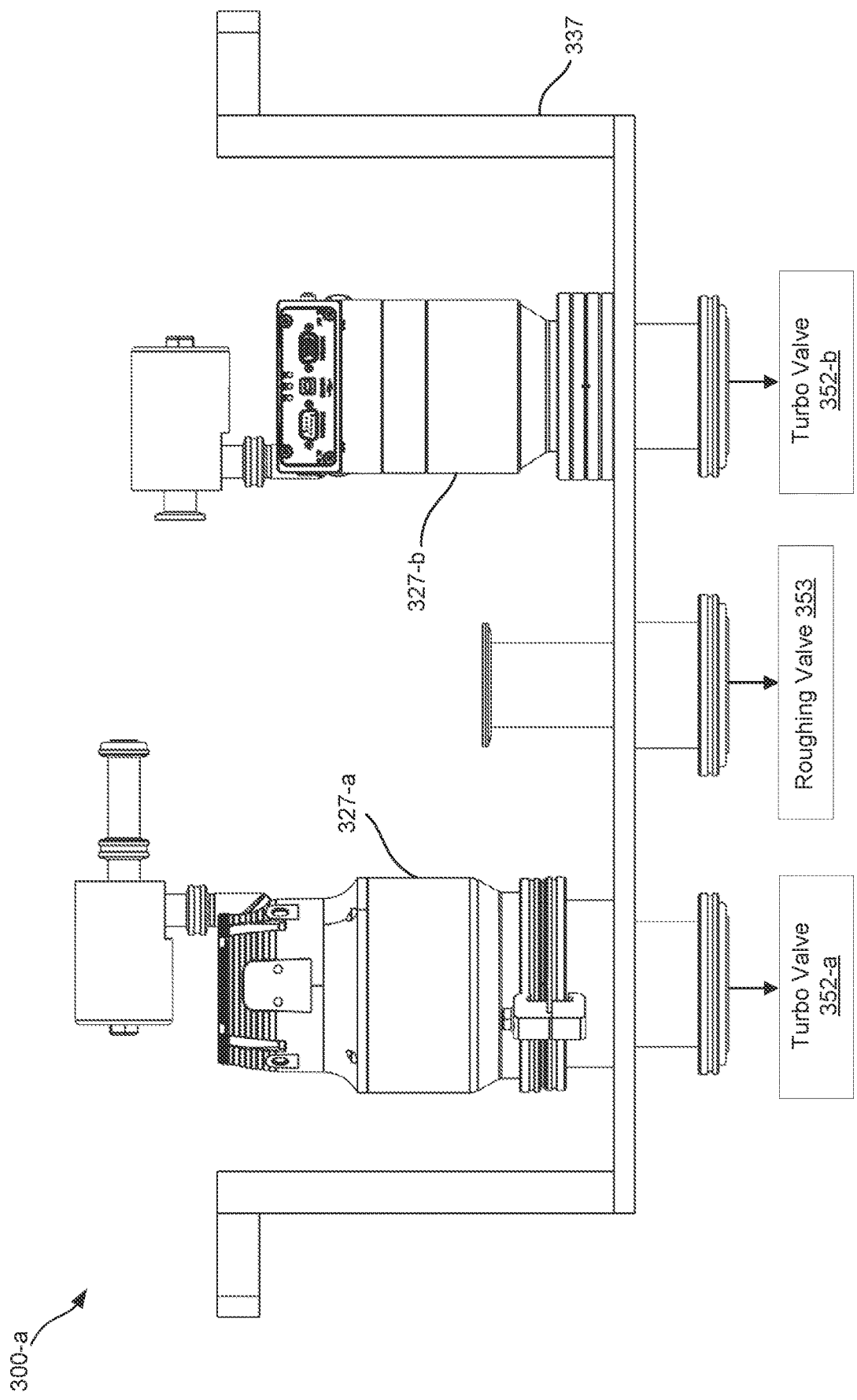

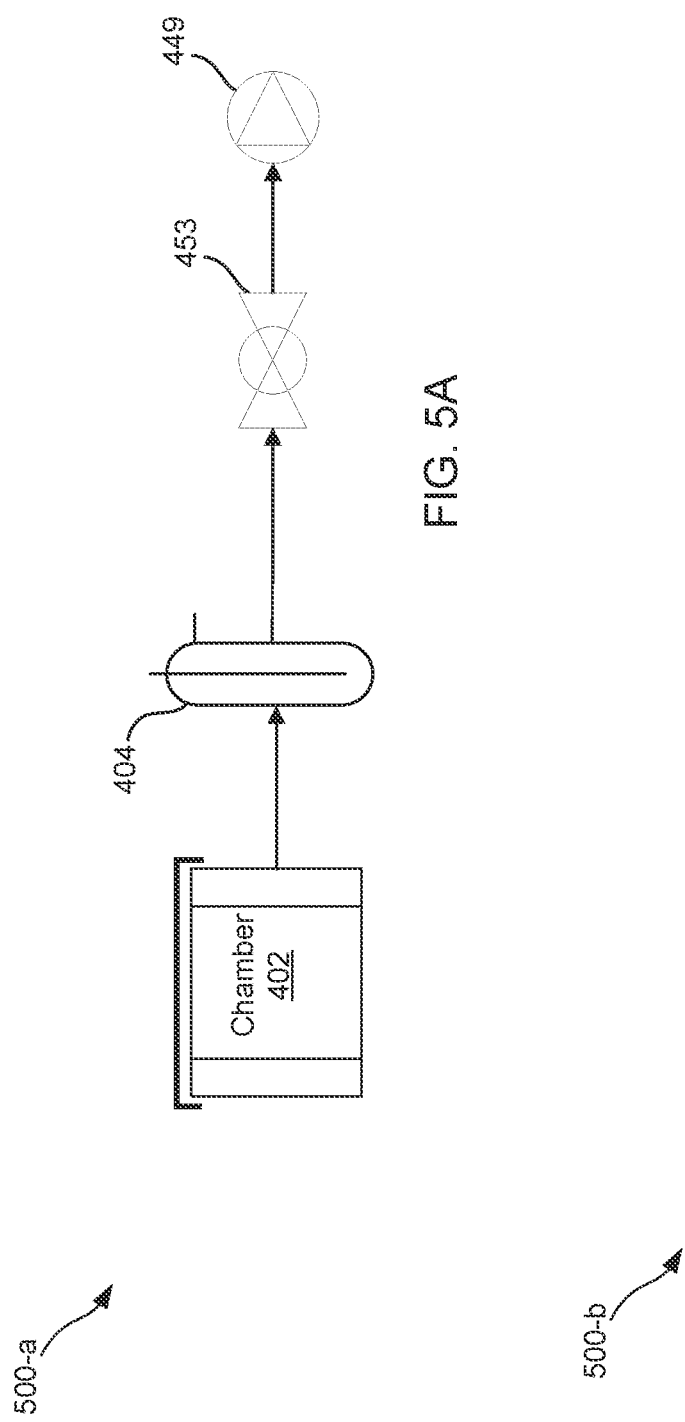
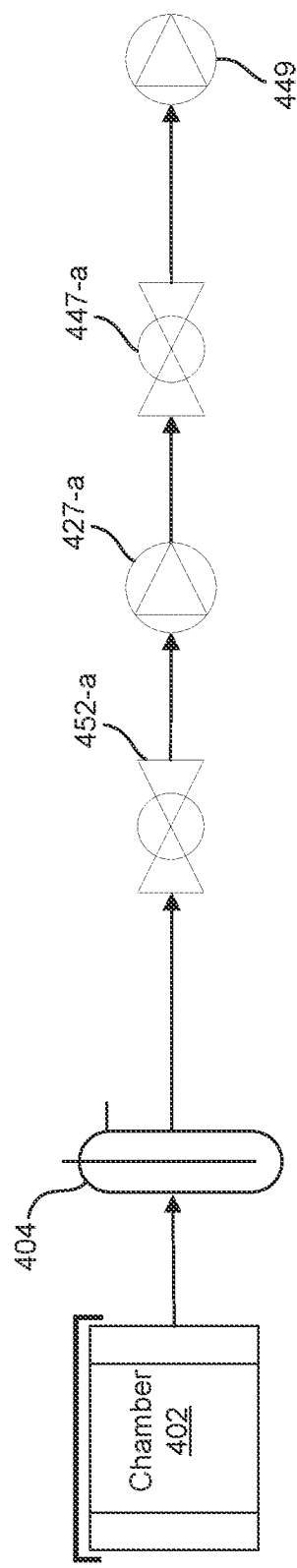
FIG. 5A
FIG. 5B

COATING SYSTEM USING A MECHANICAL PUMP AND A TURBOMOLECULAR PUMP

CROSS REFERENCE TO RELATED APPLICATIONS

The present application for patent claims priority to Provisional Application No. 63/277,000, entitled "Coating System with Turbo," filed Nov. 8, 2021, and assigned to the assignee hereof and hereby expressly incorporated by reference herein and for all practical purposes.

FIELD OF THE DISCLOSURE

The present disclosure relates generally to a coating system. In particular, but not by way of limitation, the present disclosure relates to systems, methods and apparatuses for a coating system with one or more turbo pumps.

DESCRIPTION OF RELATED ART

Parylene may be applied as a thin film coating to waterproof electronics, add dry lubricity, add a dielectric layer or enhance adhesion to other coatings. Parylene coatings are a popular choice in applications where reliability and performance are important, such as for industrial and consumer electronics, aerospace and medical applications, etc. Parylene deposition usually occurs in a low-pressure chamber, during which parylene deposits molecule by molecule onto parts or substrates placed in the deposition chamber. Current techniques for achieving low-pressure conditions in coating chambers are lacking in several regards, notably in pump down times and cost. Thus, there is a need for a refined coating system that not only optimizes pump down time, but is also more cost effective, and therefore more accessible to a wide variety of parts and substrates.

The description provided in the description of related art section should not be assumed to be prior art merely because it is mentioned in or associated with this section. The description of related art section may include information that describes one or more aspects of the subject technology.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In some aspects, the techniques described herein relate to a system for thin-film deposition, including: a deposition chamber configured to hold one or more specimens, wherein the deposition chamber is configured to be coupled to a furnace at a proximal end and a pumping system at a distal end. The pumping system includes at least: a first pump and a second pump, wherein a pumping speed of each of the first pump and the second pump is based at least in part on an operating pressure. The system for thin-film deposition further includes a controller, wherein the controller includes one or more hardware processors configured by machine-readable instructions to control activation of the first pump to initiate a pump down operation of the deposition chamber, determine a cut-in pressure for switching operation from the first pump to the second pump, monitor an internal pressure of the deposition chamber, switch operation of the pumping system from the first pump to the second pump based at least in part on determining that the internal pressure of the deposition chamber is at or below the cut-in pressure, and continue, using the second pump, the pump down operation of the deposition chamber until the internal pressure is at or below a target pressure for thin-film deposition. In some implementations, the thin-film deposition comprises parylene deposition.

In some aspects, the techniques described herein relate to a method for thin-film deposition, including: providing a deposition chamber having a proximal end and a distal end, wherein the deposition chamber is shaped and sized to hold one or more specimens; arranging the one or more specimens in the deposition chamber; and coupling a pumping system to the distal end of the deposition chamber, wherein the pumping system includes at least a first pump associated with a first pump down curve, and a second pump associated with a second pump down curve, wherein the first pump down curve is different from the second pump down curve. The method for thin-film deposition further includes controlling activation of the first pump to start a pump down operation of the deposition chamber; determining a cut-in pressure for switching operation from the first pump to the second pump; monitoring an internal pressure of the deposition chamber; switching operation of the pumping system from the first pump to the second pump based at least in part on determining that the internal pressure of the deposition chamber is at or below the cut-in pressure; and controlling the second pump, wherein controlling the second pump includes continuing, using the second pump, the pump down operation of the deposition chamber until the internal pressure is at or below a target pressure for thin-film deposition.

In some aspects, the techniques described herein relate to a non-transient computer-readable storage medium having instructions embodied thereon, the instructions being executable by one or more processors to perform a method for thin-film deposition, the method including: providing a deposition chamber having a proximal end and a distal end, wherein the deposition chamber is shaped and sized to hold one or more specimens; arranging the one or more specimens in the deposition chamber; coupling a pumping system to the distal end of the deposition chamber, wherein the pumping system includes at least a first pump associated with a first pump down curve, and a second pump associated with a second pump down curve, wherein the first pump down curve is different from the second pump down curve. In some implementations of the non-transient computer-readable storage medium, the method further includes controlling activation of the first pump to start a pump down operation of the deposition chamber, determining a cut-in pressure for switching operation from the first pump to the second pump, monitoring an internal pressure of the deposition chamber, switching operation of the pumping system from the first pump to the second pump based at least in part on determining that the internal pressure of the deposition chamber is at or below the cut-in pressure, and controlling the second pump, wherein controlling the second pump includes continuing, using the second pump, the pump down operation of the deposition chamber until the internal pressure is at or below a target pressure for thin-film deposition.

In some aspects, the techniques described herein relate to a system, wherein: a pumping speed of the first pump is higher when the internal pressure of the deposition chamber is at or above a first pressure level; and a pumping speed of the second pump is higher when the internal pressure of the deposition chamber is at or below a second pressure level, and wherein the first pressure level is equal to or substantially equal to the second pressure level.

In some aspects, the techniques described herein relate to a system, wherein the cut-in pressure is equal to or substantially equal to one or more of the first pressure level and the second pressure level.

In some aspects, the techniques described herein relate to a system, wherein the cut-in pressure is determined based on a relation between a corresponding pumping speed for one or more of the first pump and the second pump at different operating pressures.

In some aspects, the techniques described herein relate to a system, further including: a vaporizer. In some implementations, the furnace is a pyrolysis furnace, wherein the pyrolysis furnace is positioned between the vaporizer and the proximal end of the deposition chamber. In some implementations, the distal end of the deposition chamber is coupled to a cold trap, the cold trap positioned between the deposition chamber and the pumping system.

In some aspects, the techniques described herein relate to a system, wherein the vaporizer is configured to receive a powdered solid to be deposited as a thin-film on the one or more specimens in the deposition chamber, and wherein the vaporizer is further configured to vaporize or sublimate the powdered solid into a first vapor.

In some aspects, the techniques described herein relate to a system, wherein the first vapor includes a dimer vapor, and wherein the pyrolysis furnace is configured to heat the dimer vapor to transform the dimer vapor to a monomer vapor, and wherein the monomer vapor flows into the deposition chamber, and wherein an interior of the deposition chamber is maintained anywhere between 20-25 degrees Celsius (i.e., at or near room temperature).

In some aspects, the techniques described herein relate to a system, wherein the target pressure is (1) at or below 50 mTorr, or (2) at or below 10 mTorr, or (3) at or below 2 mTorr, or (4) anywhere between 30 to 50 mTorr, or (5) in a range between 10 mTorr to 50 mTorr.

In some aspects, the techniques described herein relate to a system, wherein the pumping system further includes: a first valve coupled to the first pump, wherein the first pump is a roughing pump controlled using the first valve; a second valve coupled to the second pump, wherein the second pump is a turbo pump controlled using the second valve; and wherein each of the first and the second valve are controlled using the controller.

In some aspects, the techniques described herein relate to a system, wherein the controller is configured to: open the first valve to control the activation of the first pump to initiate the pump down operation. In some implementations, switching operation of the pumping system from the first pump to the second pump includes transitioning control from the first valve to the second valve, wherein transitioning the control includes closing the first valve when the internal pressure is at or below the cut-in pressure; and opening the second valve based at least in part on closing the first valve.

In some aspects, the techniques described herein relate to a system, further including: a third pump, wherein the third pump is a turbo pump; and wherein each of the first pump, the second pump, and the third pump are associated with different pump down curves.

In some aspects, the techniques described herein relate to a system, wherein the first pump includes a mechanical pump, and the second pump includes a turbo pump. In some implementations, the mechanical pump and the turbo pump are arranged in a parallel or by-pass configuration, further described below in relation to FIG. 11A. In other implementations, the mechanical pump and the turbo pump are arranged in a series configuration, wherein the turbo pump is positioned between the mechanical pump and the distal end of the deposition chamber, further described below in relation to FIG. 11B.

In some aspects, the techniques described herein relate to a system, wherein the controller is configured to: operate the first pump for a first duration; and operate the second pump for a second, different duration. In some cases, the first duration is shorter than the second duration. Alternatively, the second duration is shorter than the first duration.

In some aspects, the techniques described herein relate to a system, wherein each of the one or more specimens includes an electrical part or wafer, and wherein the thin-film deposition includes a parylene deposition.

In some aspects, the techniques described herein relate to a method, wherein the pumping system further includes a first valve coupled to the first pump, wherein the first pump is a roughing pump controlled using the first valve, and a second valve coupled to the second pump, wherein the second pump is a turbo pump controlled using the second valve. In some implementations, the method further includes opening the first valve to control the activation of the first pump to start the pump down operation. In some implementations of the method, switching operation of the pumping system from the first pump to the second pump includes transitioning control from the first valve to the second valve, wherein transitioning the control includes (1) closing the first valve when the internal pressure is at or below the cut-in pressure, and (2) opening the second valve, based at least in part on closing the first valve.

In some aspects, the techniques described herein relate to a method, wherein a pumping speed of each of the first pump and the second pump is based at least in part on an operating pressure, and wherein the cut-in pressure is determined based on a relation between a corresponding pumping speed for one or more of the first pump and the second pump at different operating pressures.

In some aspects, the techniques described herein relate to a method, wherein each of the one or more specimens includes an electrical part or wafer, and wherein the thin-film deposition includes a parylene deposition.

In some aspects, the techniques described herein relate to a method, wherein the first pump includes a mechanical pump, and the second pump includes a turbo pump, and wherein: (1) the mechanical pump and the turbo pump are arranged in a parallel or by-pass configuration; or (2) the mechanical pump and the turbo pump are arranged in a series configuration, wherein the turbo pump is positioned between the mechanical pump and the distal end of the deposition chamber.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 3A illustrates a side view of a vacuum pumping system comprising one or more turbo pumps, according to various aspects of the disclosure.

FIG. 5A illustrates an example of a first pumping stage of the coating system in FIG. 4, according to various aspects of the disclosure.

FIG. 5B illustrates an example of a second pumping stage of the coating system in FIG. 4, according to various aspects of the disclosure.

DETAILED DESCRIPTION

Figure 1:
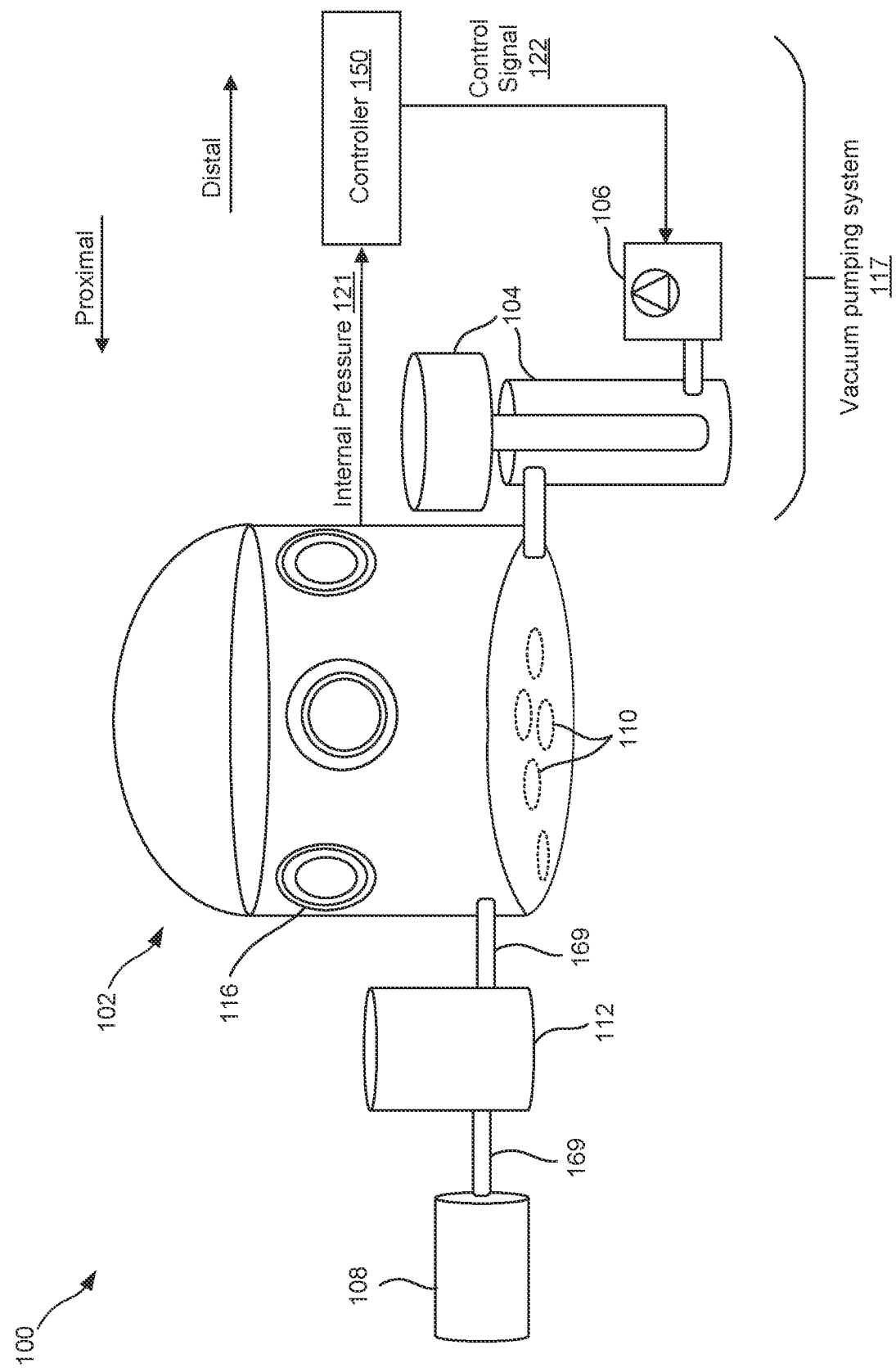
FIG. 1 illustrates an example of a coating system comprising a vacuum pumping system, according to various aspects of the disclosure.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The present disclosure relates generally to a coating system. More specifically, but without limitation, the present disclosure relates to a thin-film deposition or coating system, such as, but not limited to, a parylene coating system, which integrates one or more turbo pumps to optimize pump down time. In some cases, turbo pumps may also be referred to as turbomolecular pumps, and the two terms may be used somewhat interchangeably throughout this disclosure. Furthermore, while generally described with reference to parylene coatings, aspects of this disclosure may be similarly applied to other vacuum deposition coating systems, not just parylene coating systems. In other words, the parylene coating systems described herein are merely examples and are not intended to be limiting. In some cases, the pumping systems described in this disclosure may be employed for other vacuum deposition coating techniques requiring low pressure conditions, a specific pump down curve, a specific target pressure, or a combination thereof. It should also be noted that the model numbers of pumps (e.g., mechanical pumps, turbo or turbomolecular pumps) and their associated simulation and/or testing data discussed in relation to the figures below are not intended to be limiting. Said another way, the specific pumps are immaterial insofar as the focus is on the general principles of the pump down operation of the different types of pumps and when one or more turbo pumps may be utilized to optimize the overall pump down curve of the pumping system. As used herein, the terms "pumping system" and "vacuum pumping system" may be used somewhat interchangeably throughout the disclosure. Additionally, a pumping system may comprise a plurality of pumps (e.g., roughing pump, turbo pump), a plurality of different types of pumps, a plurality of turbo pumps, or a combination thereof.

Figure 7:
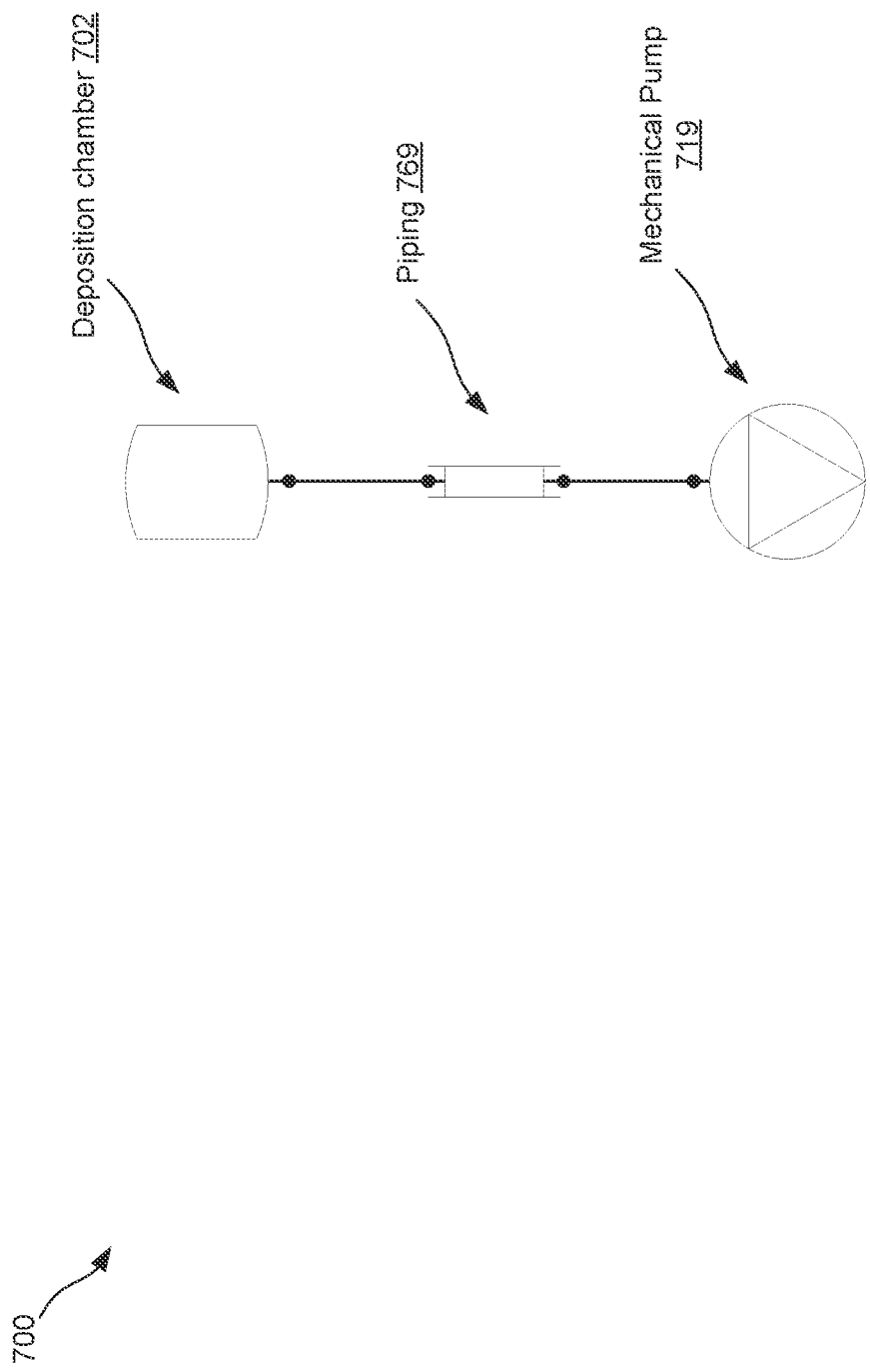
FIG. 7 illustrates an example of a vacuum pumping system of a coating system utilized for thin-film deposition in the prior art.

Parylene films are usually grown as molecule-by-molecule vapor deposits on specimens (e.g., parts, substrates, wafers, etc.) in a low-pressure or vacuum chamber, also referred to as a deposition chamber (e.g., shown as deposition chamber 102 in FIG. 1). In some examples, the low-pressure or vacuum chamber may be operated at or near ambient/room-temperature, for instance, anywhere between 17-25 degrees Celsius. In some cases, the internal pressure in the chamber may need to be brought down below 50 mTorr for parylene deposition to occur. In some circumstances, when high volumes of specimens (e.g., parts or substrates) with high outgassing characteristics are coated, the time required to pump down the chamber may be significant (e.g., >4 hours, >6 hours, etc.), which may not only increase the cost of coating, but also increase the complexity of the parylene coating process. Currently, most parylene coating systems utilize a single oil pump to provide the pumping force required to achieve the adequate level of internal pressure needed for the parylene deposition process. FIG. 7 illustrates an example of a vacuum pumping system (shown as mechanical pump 719) coupled to a deposition chamber 702 of a coating system 700 utilized for thin-film deposition (e.g., parylene deposition) in the prior art.

In some circumstances, prior art coating systems have also resorted to using (1) larger pumps to achieve faster pump down times and/or (2) roots blower pumps to evacuate the chamber faster. In some other cases, specimens (e.g., substrates or wafers) are pumped down in a separate chamber, referred to as "pre-outgassing". These pumping systems suffer a few deficiencies, including, but not limited to, slow pump down times, high power consumption, larger footprints and/or audible noise. In some circumstances, the associated time, cost, and/or footprint limitations makes parylene coating commercially unfeasible using these pumping systems. In some other cases, prior art pumping systems are ineffective at lower pressures (e.g., <500 mTorr, <200 mTorr, etc.), making them impractical, if not impossible, for use with certain coating systems (e.g., parylene coating systems) that require a certain target pressure (e.g., <50 mTorr, <10 mTorr) to be attained before the coating cycle can begin. Due to the significant amount of time needed to outgas parts and the amount of outgassing that continues to occur during the parylene deposition process, currently used pumping systems are not very effective in cost, time, and/or accessibility.

In some embodiments of the disclosure, one or more turbo pumps (e.g., shown as turbo pump 427-a in FIG. 5B) may be integrated into the pumping system (e.g., shown as vacuum pumping system 117 in FIG. 1) of a parylene coating system, which may serve to reduce the time for the parylene deposition process, thus making it less expensive and more accessible to a wider variety of parts and substrates. In some examples, parylene may be applied (or deposited) in a low-pressure coating system using a multi-stage, vapor deposition process, further described in relation to FIGS. 1 and 2 below. While the disclosure generally describes the use of turbo pumps for a parylene coating system, this is not intended to be limiting. In other words, turbo pumps may be integrated into other coating systems besides parylene coating systems in different embodiments.

Turning now to FIG. 1, which illustrate a coating system 100 for thin-film deposition, such as parylene deposition, according to various embodiments of the disclosure. As seen, the coating system 100 comprises a vaporizer 108 having a proximal end and a distal end, a pyrolysis furnace 112 coupled to the distal end of the vaporizer 108, a deposition chamber 102 coupled to the pyrolysis furnace 112 and a vacuum pumping system 117. The vacuum pumping system 117 (or simply pumping system 117) comprises one or more pump(s) 106 and an optional cold trap 104, where the cold trap 104 is positioned between the one or more pump(s) 106 and the deposition chamber 102. In some examples, the deposition chamber 102 comprises one or more viewports 116 to enable a user to view one or more specimens 110 (e.g., wafers or substrates) positioned inside the chamber. In some examples, the vacuum pumping system 117 further includes a controller 150, where the controller 150 is configured to measure or monitor an internal pressure 121 of the deposition chamber 102 and output a control signal 122 to effectuate one or more aspects of the disclosure.

In some circumstances, the parylene vapor deposition process produces thin films that grow uniformly on a surface (e.g., of a specimen 110) one molecule at a time, further described below. In some cases, the parylene dimer (e.g., in a solid powdered form) may be placed inside the vaporizer 108, where it is heated and sublimed (i.e., turned from a solid to a gas). For example, the parylene dimer may be fed in from the proximal end of the vaporizer 108, where it sublimates into a vapor (e.g., at or around 170 degrees Celsius). After sublimation, the parylene dimer vapor flows into the pyrolysis furnace 112, where the pyrolysis furnace 112 further heats the dimer vapor to convert it into a monomer vapor. In one non-limiting example, the pyrolysis furnace 112 heats the parylene dimer vapor to anywhere between 650 to 690 degrees Celsius and turns it into the monomer vapor.

In some cases, one or more specimens 110 (e.g., the parts or substrates to be coated, such as wafers) may be affixed to the inside of the deposition chamber 102. While not necessary, in some examples, the interior of the deposition chamber 102 may be maintained at or near room temperature (e.g., at or around 25 degrees Celsius, anywhere between 20 and 25 degrees Celsius, etc.). In some examples, the output of the pyrolysis furnace 112 may be coupled to one end (or opening) of the deposition chamber, while the cold trap may be coupled to another end (or opening) of the deposition chamber. In this example, the distal end of the pyrolysis furnace 112 is coupled to the proximal end of the deposition chamber 102, while the proximal end of the cold trap 104 (also shown as cold trap 404 in FIGS. 4, 5A-B) is coupled to the distal end of the deposition chamber 102. In some cases, more than one cold trap 104 may be utilized.

Figure 2:
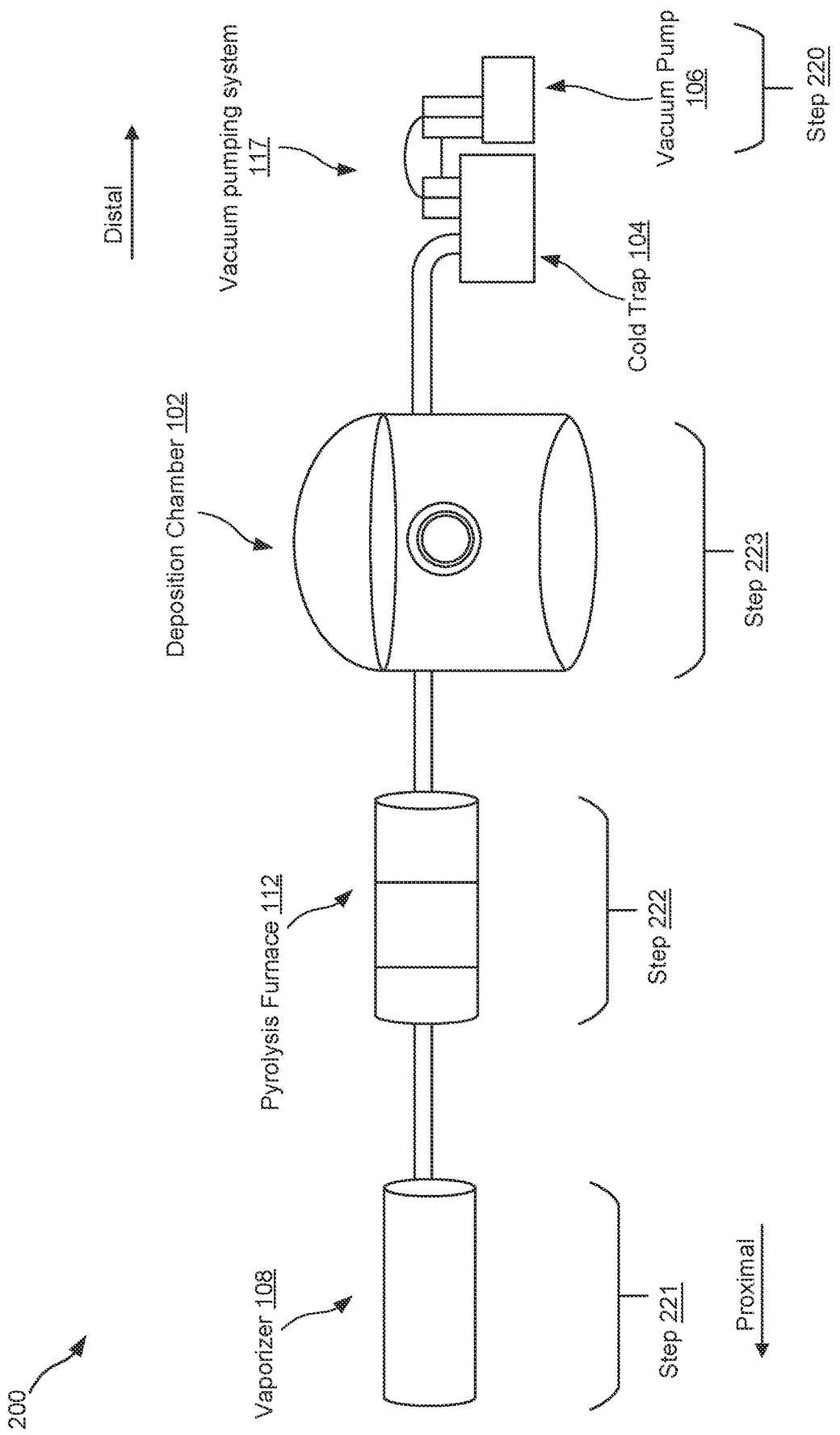
FIG. 2 illustrates an example of a process flow for thin-film deposition, according to various aspects of the disclosure.

FIG. 2 illustrates an example of a process flow 200 for thin-film deposition, such as parylene deposition, according to various aspects of the disclosure. Process flow 200 may be implemented using the coating system 100 previously described in relation to FIG. 1. In some cases, process flow 200 begins with reducing the internal pressure of the deposition chamber 102 from at or near ambient/atmospheric pressure to a target pressure, where the target pressure corresponds to a pressure required for parylene deposition to occur (shown as step 220). As noted above, the pressure in the interior of the deposition chamber may need to be significantly lower than atmospheric pressure (e.g., around 760 torr) for parylene deposition to occur. For example, a pressure at or below 50 mTorr may be required for parylene deposition to occur. In some embodiments, the interior pressure of the deposition chamber may be maintained anywhere between 30 to 50 mTorr to optimize parylene deposition on the specimens or parts (e.g., wafers) affixed to the inside of the deposition chamber 102. The vacuum pumping system (e.g., shown as vacuum pumping system 117 in FIG. 1) comprising the one or more pump(s) 106 and cold trap(s) 104 may be utilized to remove a majority of the air and gasses from the deposition chamber 102, thus reducing the pressure in the interior of the deposition chamber. Additionally, the cold trap 104 coupled to the distal end of the deposition chamber 102 may be deployed to (1) capture any excess parylene at the end of the deposition process, (2) prevent oil vapors (e.g., from the vacuum pumping system 117) from back streaming into the deposition chamber 102, or a combination thereof. That is, in some cases, the cold trap 104 may help prevent backflow into the deposition chamber 102.

As shown, process flow 200 further comprises sublimation step 221 (or simply, step 221), where sublimation step 221 includes heating up the parylene dimer (e.g., in a solid powdered form) in the vaporizer 108 such that it sublimates or vaporizes. In some cases, sublimation step 221 may be started at or around the same time as the pump down operation. Next, process flow 200 comprises pyrolysis step 222 (or simply, step 222), where the vapor (e.g., parylene dimer vapor) is heated in the pyrolysis furnace 112 to convert it into another vapor (e.g., parylene monomer vapor). In some cases, the parylene monomer vapor enters the deposition chamber 102 in a highly excited state. It should be noted that, the internal pressure of the deposition chamber 102 may be maintained at or near the target pressure (e.g., 20 mTorr, 30 mTorr, etc.) or within a range (e.g., anywhere between 2-50 mTorr) to facilitate thin-film deposition (or step 223) on the one or more specimens or wafers. For instance, after the parylene monomer vapor flows into the deposition chamber 102, it polymerizes onto the parts (e.g., wafers, substrates) placed in the interior of the chamber, shown as deposition step 223 (or simply, step 223). In some cases, the parylene polymers create a thin and uniform (or substantially uniform) coating on the surface of the parts/specimens in the chamber 102.

Thus, as seen above, the process flow 200 comprises a plurality of steps, shown as step 220, step 221, step 222, and step 223. The various steps illustrated and described in relation to FIG. 2 may be performed in any sequence or order. For instance, process flow 200 may begin with the initiation of a pump down operation (shown as step 220) of the chamber 102, followed by step 221, step 222, and step 223. In other cases, process flow 200 begins with step 221 and initiation of the pump down operation (i.e., step 220), followed by step 222. In some cases, parylene starts depositing on the wafers/substrates in the deposition chamber 102 as the highly excited monomer vapors from the pyrolysis furnace 112 enter the deposition chamber. As noted above, parylene deposition may be optimized within a target pressure range (e.g., 10-50 mTorr), and aspects of the disclosure facilitate in reducing the time needed to achieve this target pressure range and maintaining this target pressure range for the duration of the coating cycle through the use of one or more turbo pumps, described in additional detail below.

FIG. 3A illustrates a side view of a vacuum pumping system 300-a, according to various aspects of the disclosure. In one non-limiting example, the pumping system 300 may be utilized to pump out gases from a deposition or coating chamber, for instance, deposition chamber 102 in FIG. 1. Additionally, or alternatively, the pumping system 300-a may implement one or more aspects of the vacuum pumping system 117 described above in relation to FIGS. 1-2 or any of the other figures described herein. In this example, the vacuum pumping system 300-a comprises a first turbo pump 327-a (or main turbo pump 327-a), a second turbo pump 327-b (or secondary turbo pump 327-b), and a bracket or housing 337 for holding the plurality of turbo pumps 327. In some examples, the bracket or housing 337 comprises a plurality of openings, one for each turbo pump 327. The bracket 337 may also include an opening for receiving a roughing pump or another type of pump (not shown). As shown, the vacuum pumping system 300-a may also include a plurality of valves (e.g., turbo valve 352-a coupled to turbo pump 327-a, turbo valve 352-b coupled to turbo pump 327-b, roughing valve 353 coupled to roughing pump), where the valves may be used to connect/disconnect the pumps from a deposition chamber of a coating system. That is, the controllable valves may be used to control the flow through the pumps.

In some embodiments, the pumping system 300-a comprises a plurality of pumps, including at least a first pump (e.g., turbo pump 327-a, other types of pumps) and a second pump (e.g., turbo pump 327-b). The pumping system 300-a may also comprise a roughing pump (not shown). Alternatively, a roughing pump may be utilized in lieu of the secondary turbo pump 327-b, in which case the roughing valve 353 is coupled to the pump 327-b. In yet other cases, the second turbo pump 327-b may be replaced with a Roots blower pump, in which case a valve configured for use with a Roots blower pump may be utilized. In this latter case, the pumping system 300-a may comprise three different types of pumps, namely a roughing pump, a turbo pump, and a Roots blower pump.

Figure 13:
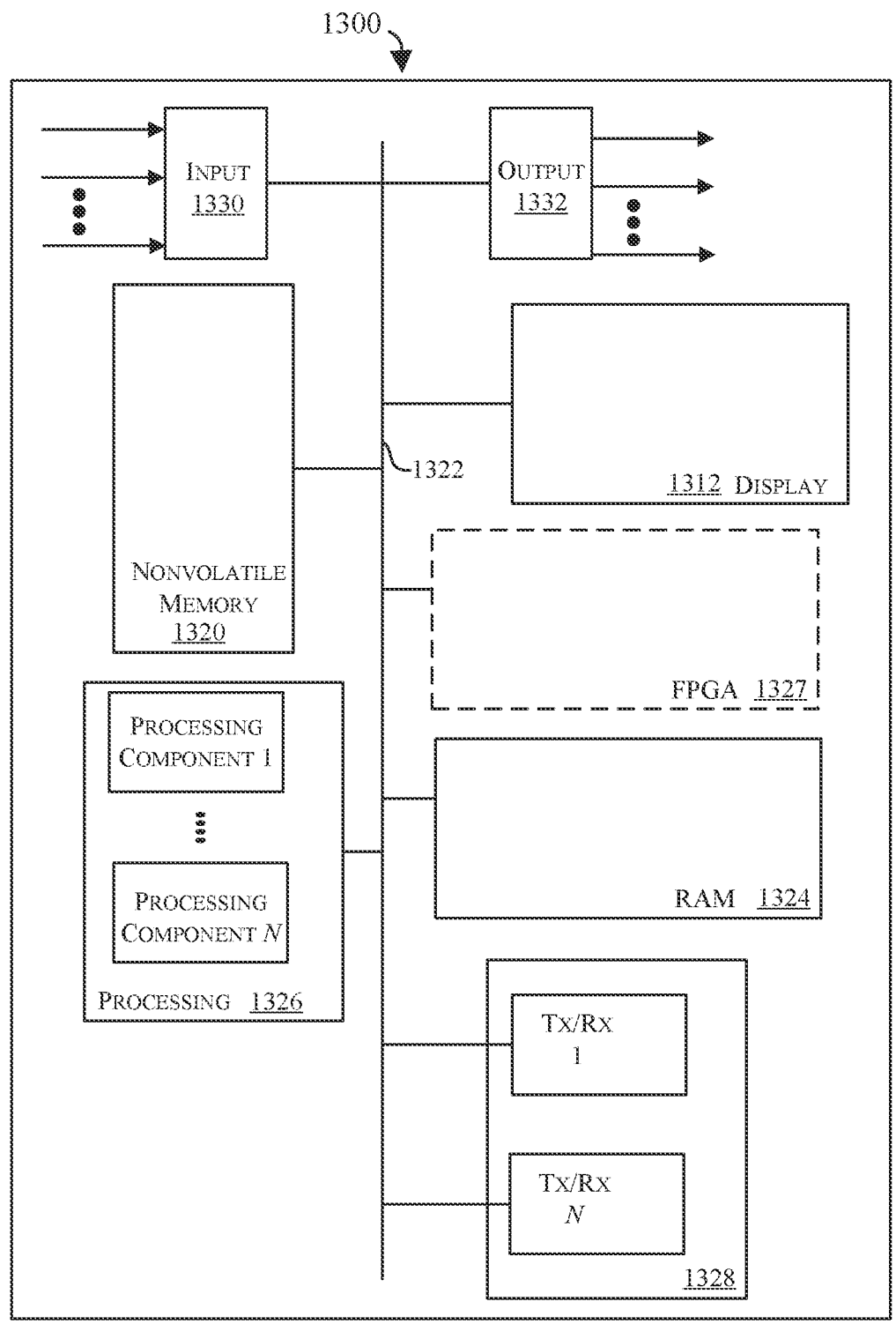
FIG. 13 is a block diagram of a computer system within which a set of instructions can execute for causing a device to perform or execute any one or more of the aspects and/or methodologies of the present disclosure.

In some embodiments, the valves of the pumping system 300-a may be controlled using an external controller, such as controller 150 in FIGS. 1 and/or 4, a microcontroller, and/or computing system 1300 in FIG. 13. Further, one or more of the turbo pump(s) 327 may be utilized in front (i.e., closer to the chamber inlet) of the roughing pump, which serves to enhance pumping speeds at low pressures (e.g., in the range of $1 \times 10^{-2}$ to $1 \times 10^{-4}$ Torr). In some cases, the valves of the pumping system 300 may be programmed to prevent them for being open at the same time. For instance, the roughing valve 353 and the second turbo valve 352-b may be closed when the first turbo valve 352-a is open, and the main turbo pump 327-a is in operation. Similarly, the main turbo valve 352-a and the second turbo valve 352-b may be closed when the roughing pump is in operation and the roughing valve 353 is open. In some examples, the pumping system 300 may initially pump through the roughing valve 353 until the pressure in the deposition chamber (e.g., deposition chamber 102) is at or under a threshold (e.g., 10 Torr). The pumping system 300 may then switch to the main turbo valve 352-a and continue to pump, using the main turbo pump 327-a, down to the operating pressure of the coating system. In some examples, the operating pressure of the coating system (e.g., coating system 100) may be at or below 50 mTorr, for instance, in the range of 50 mTorr to 10 mTorr. It should be noted that the pressure values and/or ranges described in this disclosure are merely examples and are not intended to be limiting. For instance, in one non-limiting example, the main turbo valve 352-a may be opened at a pressure higher than 10 Torr. In another non-limiting example, the main turbo valve 352-a may be opened at a pressure lower than 10 Torr. In another example, the main turbo valve 352-a may be opened at a first target pressure (e.g., 50 mTorr) and the second turbo valve 352-b may be opened at a second, different target pressure (e.g., 10 mTorr). The controller 150 of the present disclosure may be configured to monitor or measure the internal pressure of the deposition chamber 102 and transmit the control signal(s) 122 to the one or more valves of the vacuum pumping system to (1) control the opening/closing of the valves and (2) control the flow through the corresponding pumps. In some examples, the one or more turbo pumps 327 (e.g., main turbo pump 327-a, secondary turbo pump 327-b) may continue pumping down the deposition chamber until at least a target pressure is attained in the interior of the chamber. While not necessary, in some examples, the turbo pump(s) 327 may continue pumping down the deposition chamber below 10 mTorr, for instance, until a pressure between 2-10 mTorr is attained.

Figure 3B:
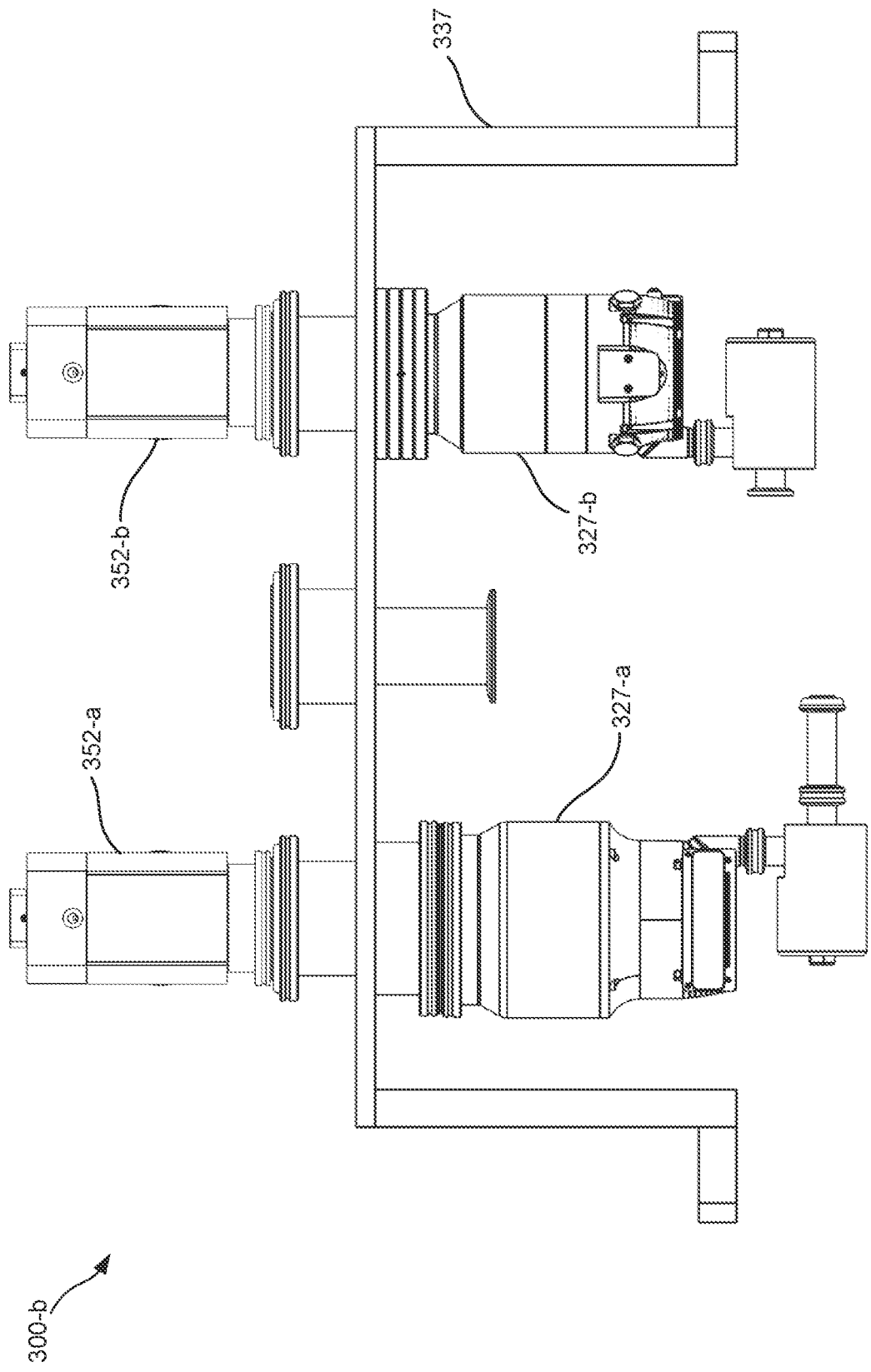
FIG. 3B illustrates another side view of the vacuum pumping system in FIG. 3A, according to various aspects of the disclosure.

FIG. 3B illustrates another side view of a pumping system 300-*b*, according to various aspects of the disclosure. The pumping system 300-*b* is similar or substantially similar to the pumping system 300-*a* described above in relation to FIG. 3A. As seen, FIG. 3B depicts turbo pumps 327-*a* and 327-*b* coupled to valves 352-*a* and 352-*b*, respectively. The valves 352 may be electronically and/or communicatively coupled to a controller, such as controller 150 in FIG. 1, where the controller is configured to open or close the valves, for instance, to control the flow through the corresponding pump. In this way, a pump can be effectively connected or disconnected from the deposition chamber based on controlling the corresponding valve connected to the pump. As noted above, the controller may monitor the internal pressure of a chamber used for thin-film deposition and (1) determine whether a particular valve, such as a turbo valve, roughing valve, etc., should be in an open or closed position, (2) determine whether a particular pump, such as a main turbo pump, a secondary turbo pump, etc., should be in operation, and/or (3) determine how long a particular pump should be in operation, or alternatively, how long a particular valve should be kept open, to name a few non-limiting examples.

Figure 4:
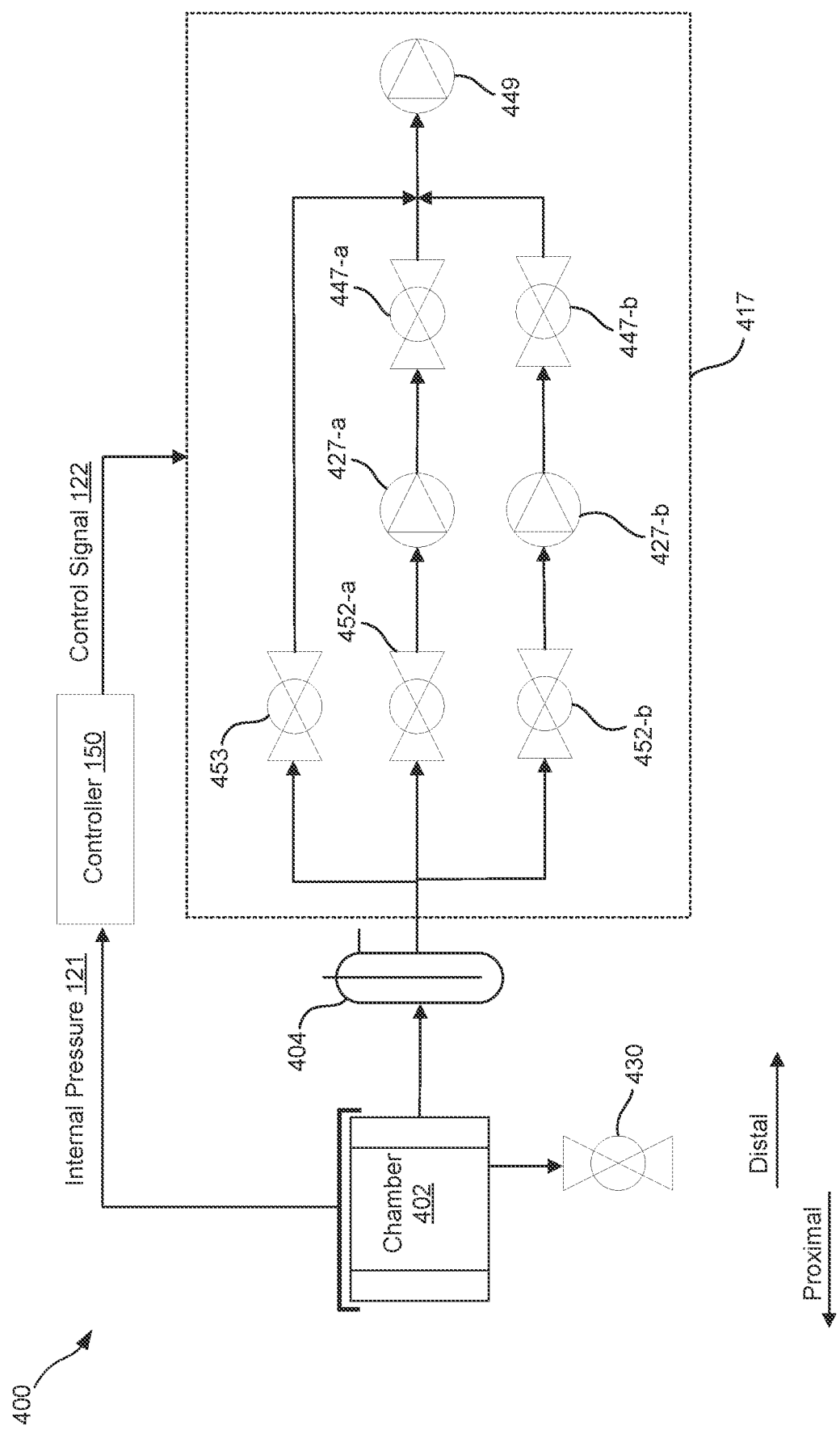
FIG. 4 illustrates an example of a coating system employing two or more pumping stages, according to various aspects of the disclosure.

FIG. 4 illustrates a schematic diagram of a coating system 400, such as a parylene coating system, according to various aspects of the disclosure. The coating system 400 may be similar or substantially similar to the coating system 100 previously described in relation to FIG. 1. As seen, the coating system 400 comprises a chamber 402 having a proximal end and a distal end, where the proximal end is coupled to one or more of a pyrolysis furnace and vaporizer (shown in FIG. 1) and configured to receive a vapor (e.g., parylene monomer vapor). Additionally, the distal end of the chamber 402 is coupled to a cold trap 404 (also shown as cold trap 104 in FIG. 1), where the cold trap 404 is coupled to a vacuum pumping system 417. The vacuum pumping system 417 is similar or substantially similar to the vacuum pumping system 117 described in relation to FIG. 1.

In this example, the vacuum pumping system 417 comprises a plurality of paths or stages, each stage comprising at least one valve and pump. For instance, the vacuum pumping system 417 comprises a first path or stage comprising a first valve 453 (e.g., a roughing valve) and a pump 449 (e.g., a mechanical pump, such as a roughing pump); a second path or stage comprising a second valve 452-*a* (e.g., first turbo valve), a second pump 427-*a* (e.g., first turbo pump), and a third valve 447-*a* (e.g., first foreline valve); and a third path or stage comprising a fourth valve 452-*b* (e.g., second turbo valve), a third pump (e.g., second turbo pump), and a fifth valve 447-*b* (e.g., second foreline valve). In some embodiments, a twin turbo (or dual-turbo) pump configuration, such as the one shown in FIG. 4, may be utilized to enhance the pumping speed, as compared to the prior art. In some cases, the coating system 400 may pump through the three different pumps (i.e., mechanical or roughing pump 449, main turbo pump 427-*a*, and secondary turbo pump 427-*b*) in stages, which may further assist in accelerating the pump down process, as described below. It should be noted that the two turbo pumps 427-*a*, 427-*b* may or may not be identical. For instance, in some cases, one of the turbo pumps (e.g., turbo pump 427-*a*) may have a higher pumping speed, a different pump down curve, and/or different pump down characteristics, than the other turbo pump (e.g., turbo pump 427-*b*). Further, the two turbo pumps may or may not be operated simultaneously. In one non-limiting example, the roughing pump (e.g., pump 449) may be employed to pump down from a first pressure (e.g., atmospheric pressure ~760 Torr) to a second pressure (e.g., 10 Torr), the first turbo pump 427-*a* may be employed to pump down from the second pressure (e.g., 10 Torr) to a third pressure (e.g., 250 mTorr), while the second turbo pump 427-*b* may be employed to pump down from the third pressure (e.g., 250 mTorr) to a fourth pressure (e.g., <50 mTorr). Here, the fourth pressure may correspond to the target pressure required for thin-film deposition (e.g., parylene deposition) to occur on the surfaces of the substrates/wafers. In some cases, the chamber 402 is also coupled to an optional vent valve, shown as vent valve 430 in FIG. 4.

In some examples, the mechanical pump 449 may be a roughing pump or another applicable pump (e.g., positive-displacement pump, rotary positive-displacement pump, reciprocating pump, centrifugal pump, etc.). Some non-limiting examples of roughing pumps include oil-sealed roughing pumps (e.g., rotary vane pumps, Roots lobe pumps, rotary piston pumps) and dry roughing pumps (e.g., scroll pumps, diaphragm pumps, screw rotor pumps, etc.). Other types of pumps, such as a Roots-type blower pump, may be utilized in different embodiments.

In some embodiments, one or more of the valves (e.g., roughing valve 453, turbo valve 452-*a*, turbo valve 452-*b*) may be controlled using a programmable controller, such as controller 150. The controller 150 may be configured to control the desired pumping line (i.e., pumping path or stage) such that no two valves are open at the same time. In some cases, the different pumps of the coating system 400 may operate differently based on their pump down curves, described in further detail below. For instance, different pump types (e.g., mechanical pump, turbo pump) may have different pumping speeds at different operating pressures. In some aspects, the present disclosure facilitates in determining the pressure at which the coating system should switch between different pump types to optimize the pump down speed. As an example, the mechanical or roughing pump 449 may be used to initially evacuate the deposition chamber 402 and may be used as a first stage towards achieving low pressure conditions. In some cases, roughing pumps usually work in "rough vacuum", above $10^{-3}$ Torr. In some circumstances, pumps optimized to work in low pressure conditions may operate inefficiently at atmospheric pressure. That is, the pumping speed of the mechanical or roughing pump 449 may decrease as the internal pressure of the chamber 402 decreases. Aspects of this disclosure relate to utilizing different types of pumps (e.g., both mechanical and turbo pumps) having different pump down curves to optimize pump down time, as compared to the prior art. In some cases, aspects of this disclosure also relate to controlling the pressures at which the valves (e.g., roughing valve 453, turbo valves 452-*a* and 452-*b*) of the different pumps are opened and/or the speed at which the turbo pump(s) 427 are run to regulate the internal pressure of the chamber 402, to name two non-limiting examples.

FIG. 5A illustrates an example of a first pumping stage 500-*a* (or roughing pump path) of the coating system in FIG. 4, according to an embodiment of the disclosure. FIG. 5B illustrates an example of a second pumping stage 500-*b* (or turbo pump path) of the coating system in FIG. 4, according to an embodiment of the disclosure. As seen, the second pumping stage 500-*b* utilizes a turbo pump (e.g., turbo pump 427-*a*) and a turbo valve (e.g., shown as valve 452-*a*). In some cases, the third pumping stage (e.g., with turbo pump 427-*b* and turbo valve 452-*b*) shown in FIG. 4 implements one or more aspects of the second pumping stage 500-*b* but uses a different turbo pump with different pumping characteristics (e.g., pumping speed, pump down curve). In one non-limiting example, the second pumping stage 500-*b* utilizes a larger turbo pump (e.g., a turbo pump having a higher pumping speed) than the turbo pump used in the third pumping stage. In some other cases, the two turbo pumps 427-*a*, 427-*b* may be identical, and their turbo valves 452-*a*, 452-*b* may be opened at different pressures.

In some cases, the roughing pump path (i.e., associated with the first pumping stage 500-*a*) may be employed to lower the pressure in the chamber 402 from at or near atmospheric pressure to a cut in pressure. The cut in pressure selected may be based on one or more factors, such as the pump down curve of the turbo pump 427-*a*. In one non-limiting example, the cut in pressure may be anywhere between 10 Torr and 2 Torr. Other cut in pressures are contemplated in different embodiments, and the examples listed herein are not intended to be limiting.

Figure 6:
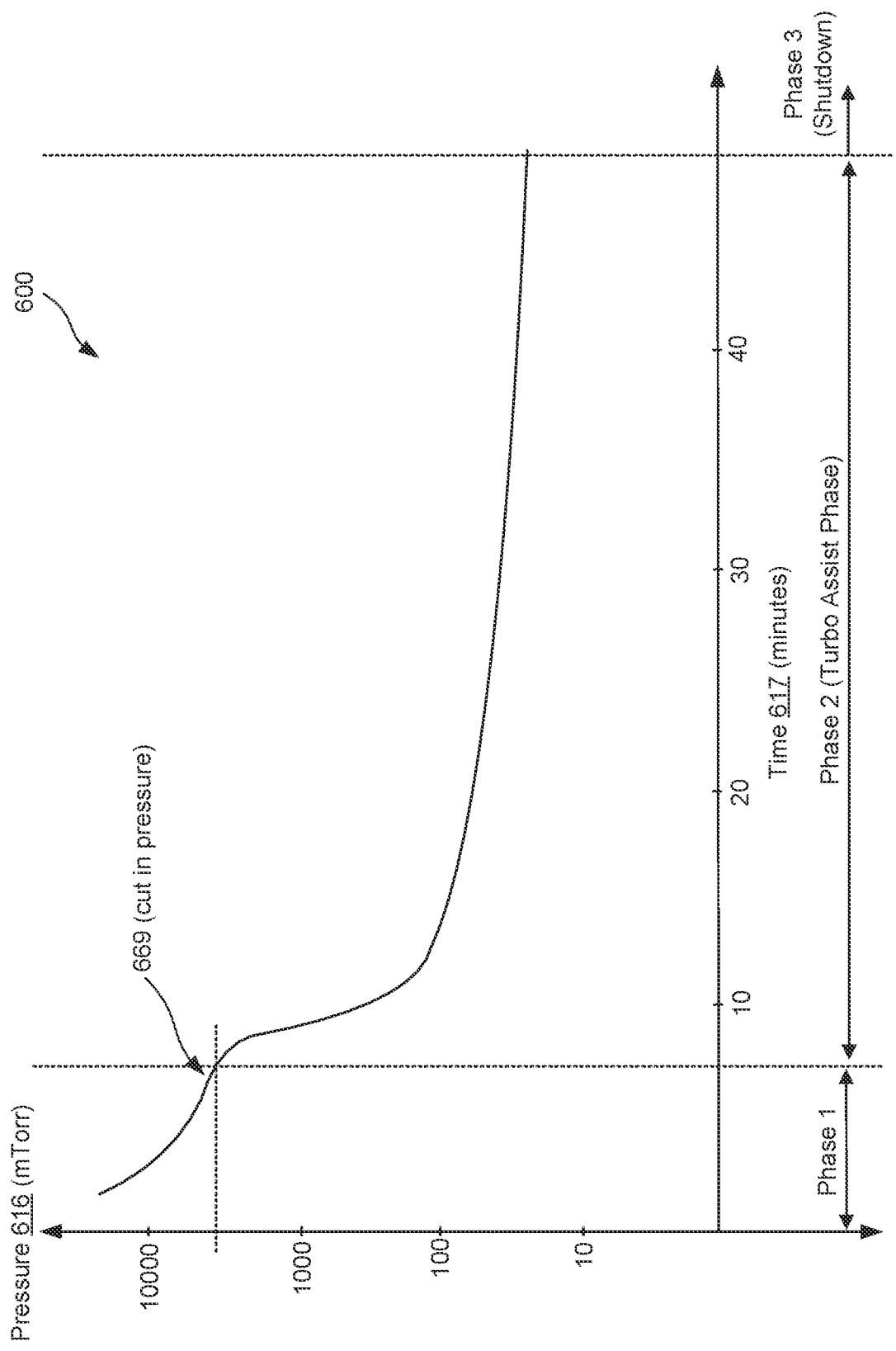
FIG. 6 illustrates an example of a pump down curve showing pressure against time for a coating system, according to various aspects of the disclosure.

FIG. 6 illustrates a conceptual graph of a pump down curve 600 showing pressure 616 against time 617 for the coating system 400 in FIG. 4, according to various embodiments of the disclosure. It should be noted that, the scale on the vertical axis (or y-axis) for the conceptual graph in FIG. 6 is logarithmic.

As seen, the pump down curve 600 includes three distinct phases based on which pump (e.g., roughing pump, turbo pump) is active. In Phase 1, the roughing pump (i.e., mechanical pump 449) is active, which causes the pressure in the deposition chamber 402 to reduce from atmospheric pressure (e.g., 760,000 mTorr or 760 Torr) to a cut in pressure 669 (e.g., at or around 10 Torr). The cut in pressure 669 (i.e., the pressure at which the roughing pump 449 is switched off and the turbo pump 427 is initiated) may be selected based on a pressure (e.g., anywhere between 2-10 Torr) at which the pressure curve for the roughing pump 449 starts leveling out. In some cases, during Phase 1, the roughing valve 453 is open, and the foreline and turbo valve(s) 447 and 452, respectively, are closed.

Phase 2, also referred to as the Turbo Assist phase, initiates at the cut in pressure 669. In this phase, the roughing valve (e.g., roughing valve 453 in FIG. 4) is closed, and at least one set of foreline and turbo valves (e.g., foreline valve 447-*a* and turbo valve 452-*a*; or foreline valve 447-*b* and turbo valve 452-*b*) are open. As seen in FIG. 6, turning the turbo pump (e.g., turbo pump 427-*a*) on helps decreases the pressure in the chamber, which serves to reduce coating cycle time. In this example, the turbo pump rapidly decreases the pressure from the cut-in pressure (e.g., anywhere between 2-10 Torr) to about 300 mTorr (0.3 Torr) in a few minutes. In the example shown, the rate at which the pressure decreases slows down after the 13-15-minute mark, but the turbo pump continues to steadily decrease the chamber pressure from 300 mTorr to about 25 mTorr until the 50-minute mark. Phase 3 (Shutdown) is triggered when the deposition process ends. In this phase, all three valves, namely, roughing valve, foreline valve, and turbo valve are closed.

FIG. 7 illustrates an example of a coating system 700 in the prior art. As seen, the system 700 comprises a deposition chamber 702 (e.g., for thin-film deposition), a pumping system having a single mechanical pump 719, and piping 769 to couple the mechanical pump 719 to the deposition chamber 702. In some cases, the mechanical pump 719 may include an oil-sealed vacuum pump (e.g., TRIVAC D 40 B).

Figure 8:
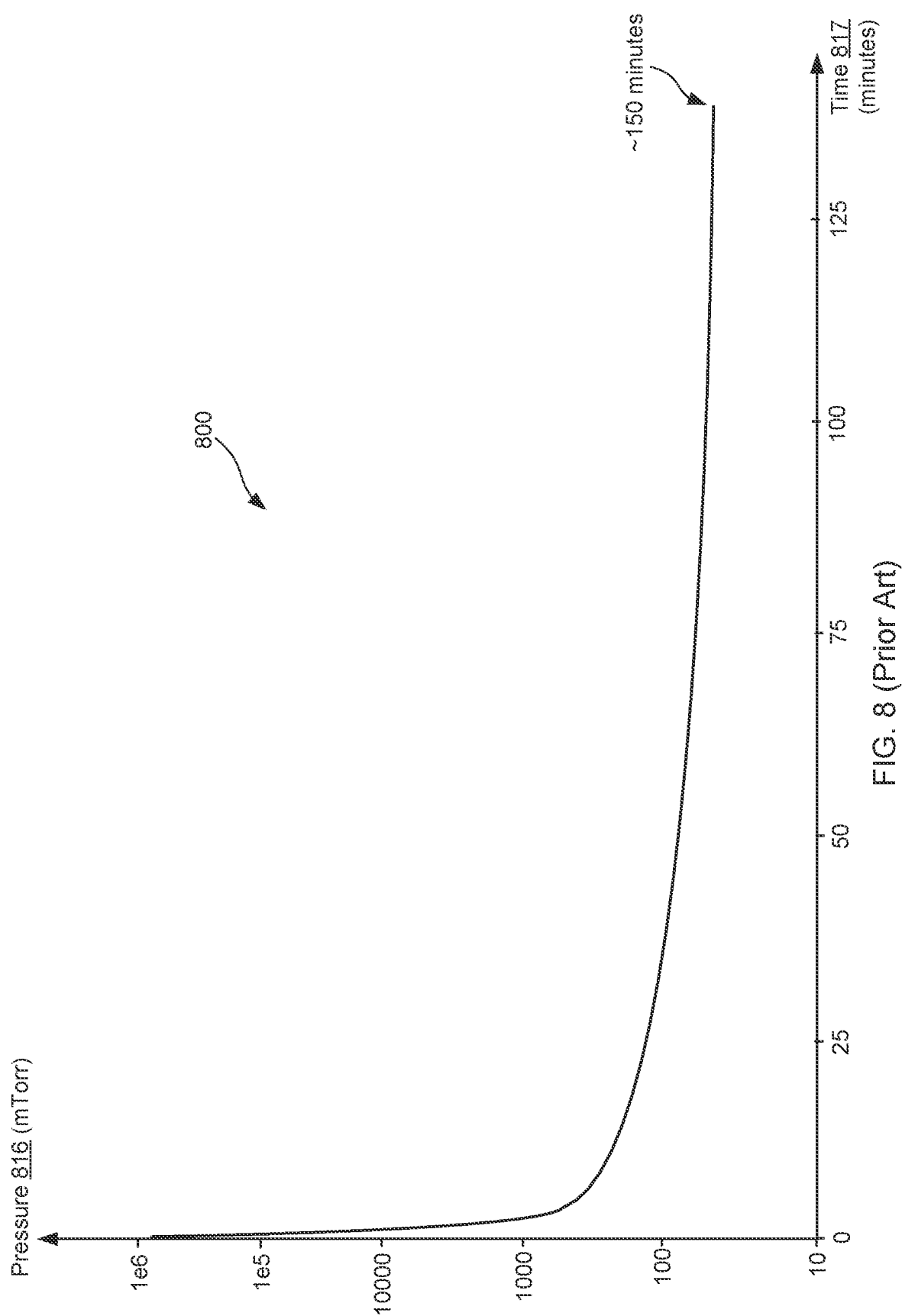
FIG. 8 illustrates an example of a pump down curve showing pressure against time for a prior art coating system, according to various aspects of the disclosure.

FIG. 8 illustrates a conceptual graph of a pump down curve 800 showing pressure 816 against time 817 for the prior art pumping system in FIG. 7. It should be noted that, the scale on the vertical axis (or y-axis) for the conceptual graph in FIG. 8 is logarithmic. In this example, the internal volume of the deposition chamber is roughly 210 liters. As seen, the pump down time to reduce the pressure in the chamber from atmospheric pressure (e.g., 760,000 mTorr or 760 Torr) to the target pressure (e.g., around 55 mTorr) is approximately 150 minutes when the chamber volume is ~210 liters.

Figure 9A:
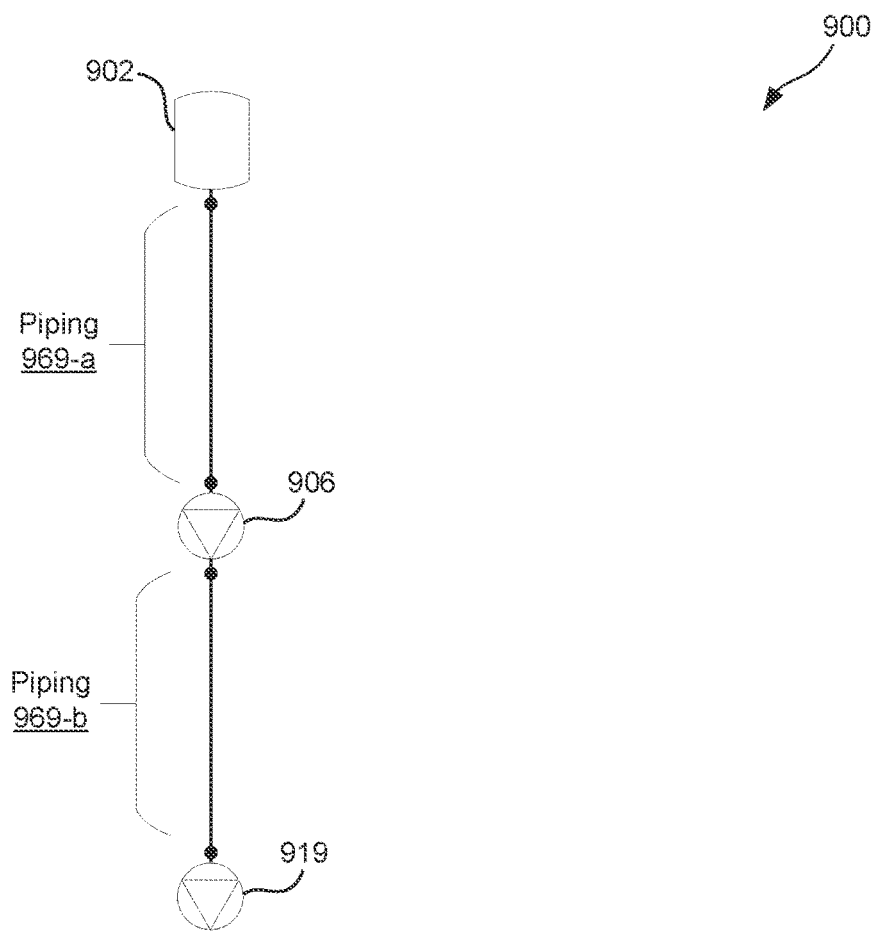
FIG. 9A illustrates a schematic diagram of a coating system, according to various aspects of the disclosure.

FIG. 9A illustrates an example of pumping system 900, according to an embodiment of the disclosure. Here, the pumping system 900 comprises a mechanical pump 919 (e.g., an oil-sealed vacuum pump, such as TRIVAC D 40B) and a turbo pump 906. The deposition chamber 902 is coupled to the turbo pump 906 using piping 969-*a*. Additionally, turbo pump 906 is coupled to the mechanical pump 919 using piping 969-*b*. It should be noted that the pumps 906, 919 depicted in FIG. 9 are merely examples and are not intended to be limiting. Different makes and models of mechanical and turbo pumps known or contemplated in the art may be utilized in different embodiments.

Figure 9B:
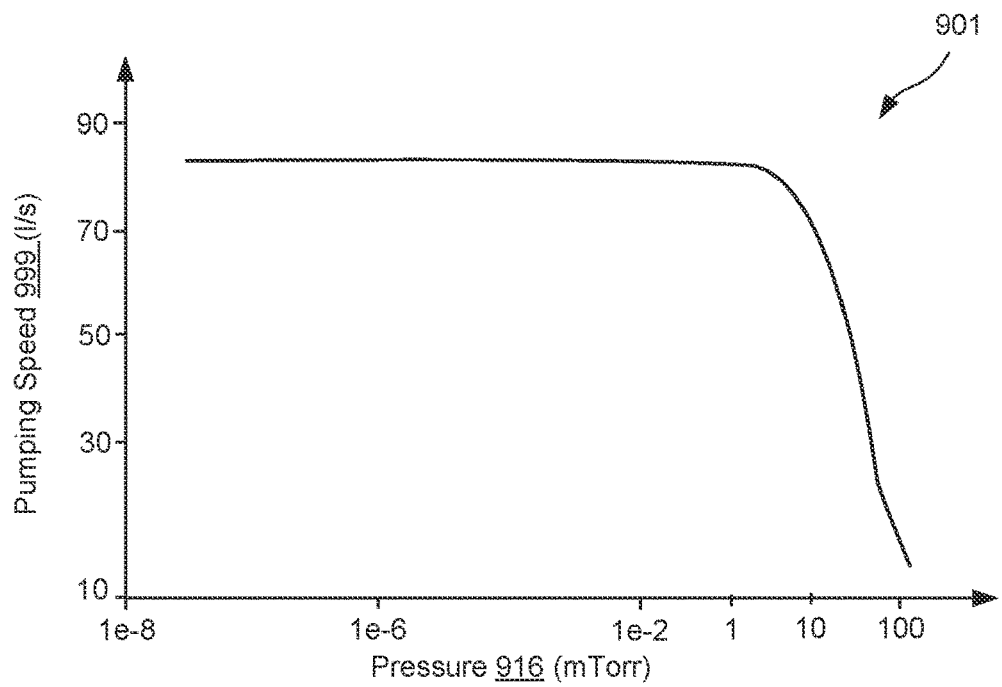
FIG. 9B illustrates a conceptual graph of pumping speed against internal pressure for the coating system in FIG. 9A, according to various aspects of the disclosure.

FIG. 9B illustrates a conceptual graph 901 of pumping speed 999 (e.g., in liters/second) against pressure 916 for the turbo pump 906 in FIG. 9A, according to various aspects of the disclosure. As seen, the pumping speed 999 of the turbo pump 906 is higher when the operating pressure is below 1 Torr. Said another way, the turbo pump is optimized for pumping at lower pressures. For example, the pumping speed 999 for the turbo pump 906 increases as the pressure drops from 200 Torr to 1 Torr. The pumping speed then remains the same or substantially the same for further decrease in pressure (e.g., from 1 Torr to 10 nanoTorr). It should be noted that, the scale on the horizontal axis (or x-axis) for the conceptual graph in FIG. 9B is logarithmic.

Figure 10:
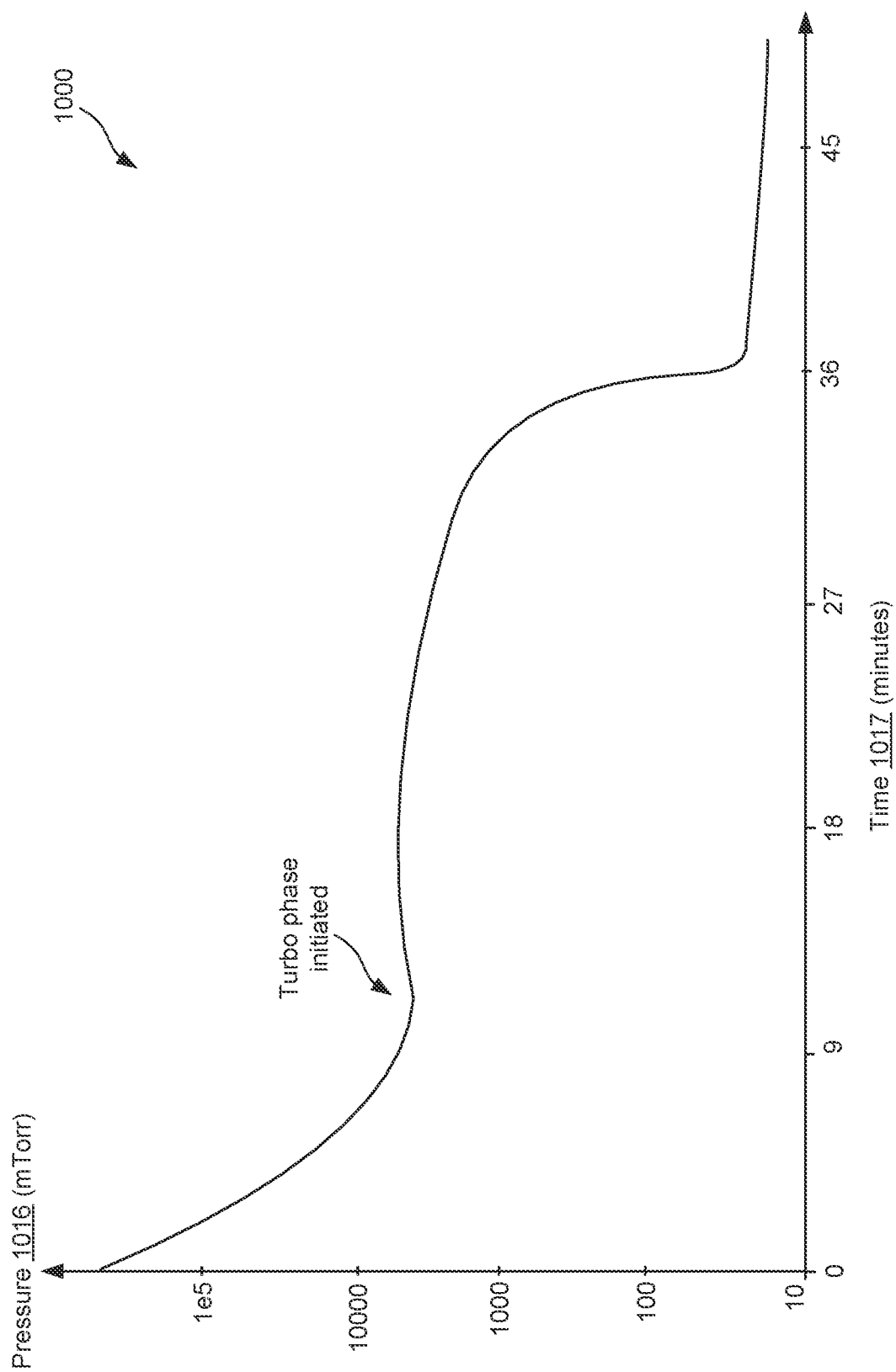
FIG. 10 illustrates a conceptual graph of internal pressure of a deposition chamber against time for a coating system, according to various aspects of the disclosure.

FIG. 10 illustrates a conceptual graph of internal pressure 1016 of a deposition chamber against time 1017 for a coating system, such as the coating system in FIG. 9A, according to various aspects of the disclosure. The coating system is similar or substantially similar to the coating system described in relation to FIG. 9A and comprises a first pump having first pumping characteristics (e.g., turbo pump 906) and a second pump having second, different pumping characteristics (e.g., mechanical pump 919). The first and the second pump may have a different pump down curve, may be optimized for different pressures, or a combination thereof. In some cases, the different pumps (e.g., mechanical, turbo pumps) may be controlled using an external controller, such as controller 150 in FIG. 1. For example, the mechanical pump may be turned on first since it is optimized for operating at higher pressures as compared to the turbo pump. Furthermore, the turbo pump may be turned on when the internal pressure of the deposition chamber is below a first threshold (e.g., cut-in pressure). In some cases, the mechanical pump may be turned off at the cut-in pressure. As seen, FIG. 10 depicts the initiation of the turbo phase at the cut-in pressure (e.g., around 5,000 mTorr or 5 Torr). As compared to the prior art pump down curve shown in FIG. 8, the time needed to reduce pressure from 760,000 mTorr down to the target pressure (e.g., 25 mTorr) is substantially lower (e.g., around 40 minutes vs 150 minutes). In this example as well, the chamber had a volume of 210 liters.

Figure 11B:
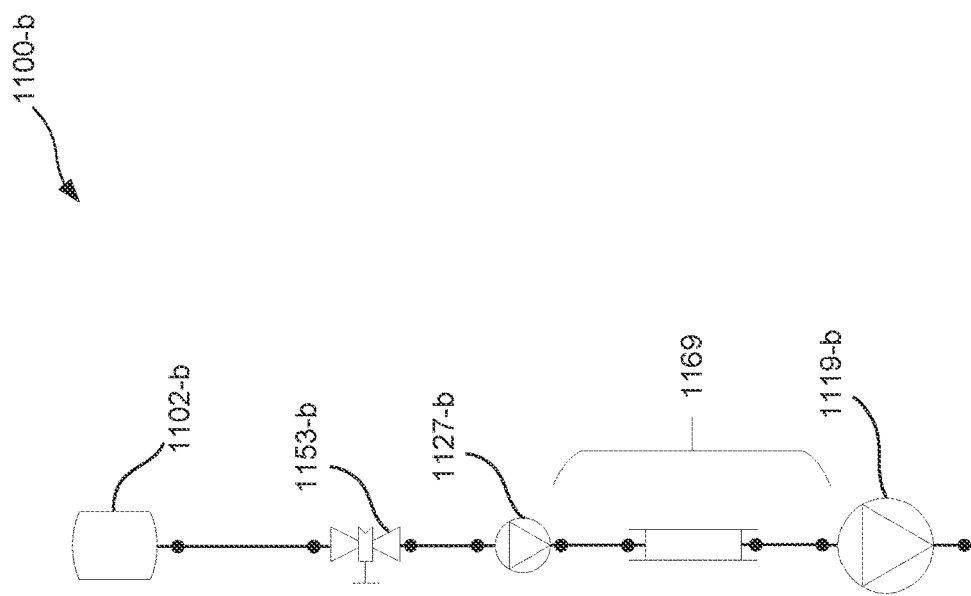
FIG. 11B illustrates a schematic diagram of a coating system employing at least one turbo pump, according to various aspects of the disclosure.
Figure 11A:
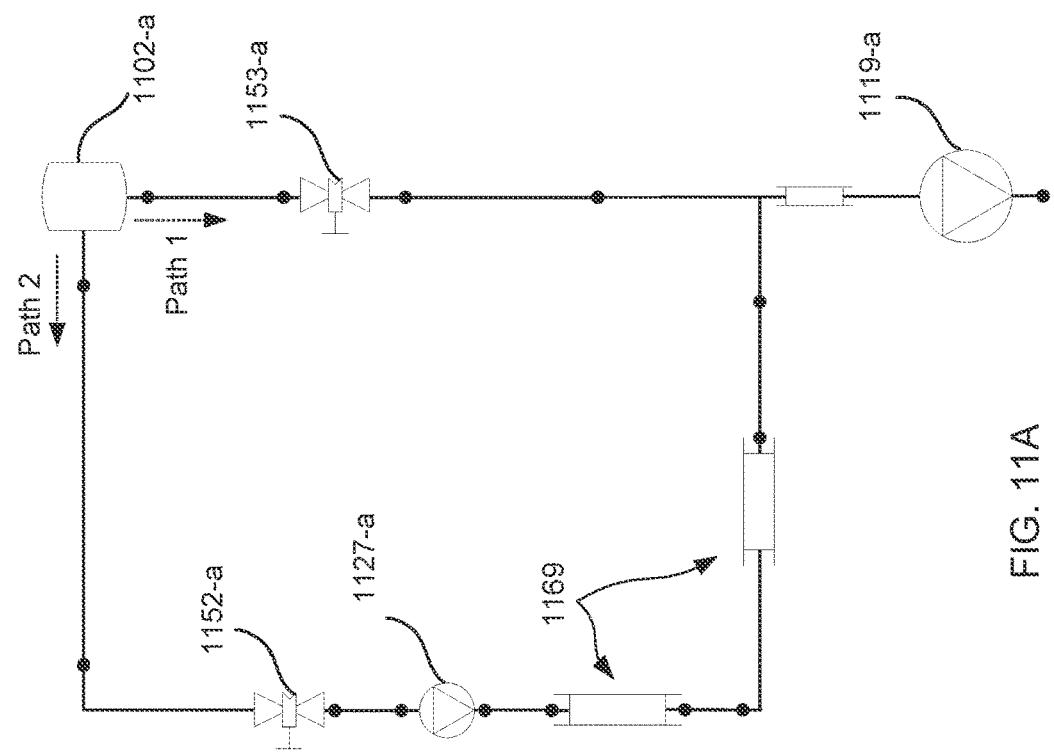
FIG. 11A illustrates a schematic diagram of a coating system employing two different pumping paths or stages, according to various aspects of the disclosure.

FIG. 11A illustrates a schematic diagram of a coating system 1100-*a* having a pumping system employing two different pumping paths or stages, according to various aspects of the disclosure. As seen, the pumping system in FIG. 11A comprises a mechanical pump 1119-*a*, a first valve 1153-*a*, a turbo pump 1127-*a*, a second valve 1152-*a*, and piping 1169 for coupling the various components of the pumping system. The pumping system is coupled to an inlet of a deposition chamber 1102-*a*.

FIG. 11B illustrates a schematic diagram of a coating system 1100-*b* having a pumping system employing a single pumping path, according to various aspects of the disclosure. As seen, the pumping system in FIG. 11B comprises a mechanical pump 1119-*b*, a turbo pump 1127-*b*, a valve 1153-*b*, and piping 1169 for coupling the various components of the pumping system. The pumping system is also coupled to an inlet of a deposition chamber 1102-*b*. Similar to FIG. 11A, the pumping system utilizes two different types of pumps (e.g., a mechanical pump and a turbo pump), with the difference being that the pumps in FIG. 11A are arranged in a parallel configuration, while the pumps in FIG. 11B are arranged in a series configuration. In some cases, the pumping system configuration in FIG. 11A may also be referred to as a by-pass configuration, as the mechanical pump 1119-*a* bypasses the turbo pump 1127-*a* when the mechanical pump 1119-*a* is active (i.e., below the cut-in pressure). In some examples, a bypass configuration (e.g., as seen in coating system 1100-*a*) may allow for maximal flow to the mechanical pump 1119-*a* (e.g., roughing pump) until the turbo pump 1127-*a* is turned on at the cut in pressure. Without a bypass, for instance, if the roughing pump is pumping directly through the turbo pump, the turbo pump may constrict the flow until it is turned on at the cut in pressure.

Figure 12:
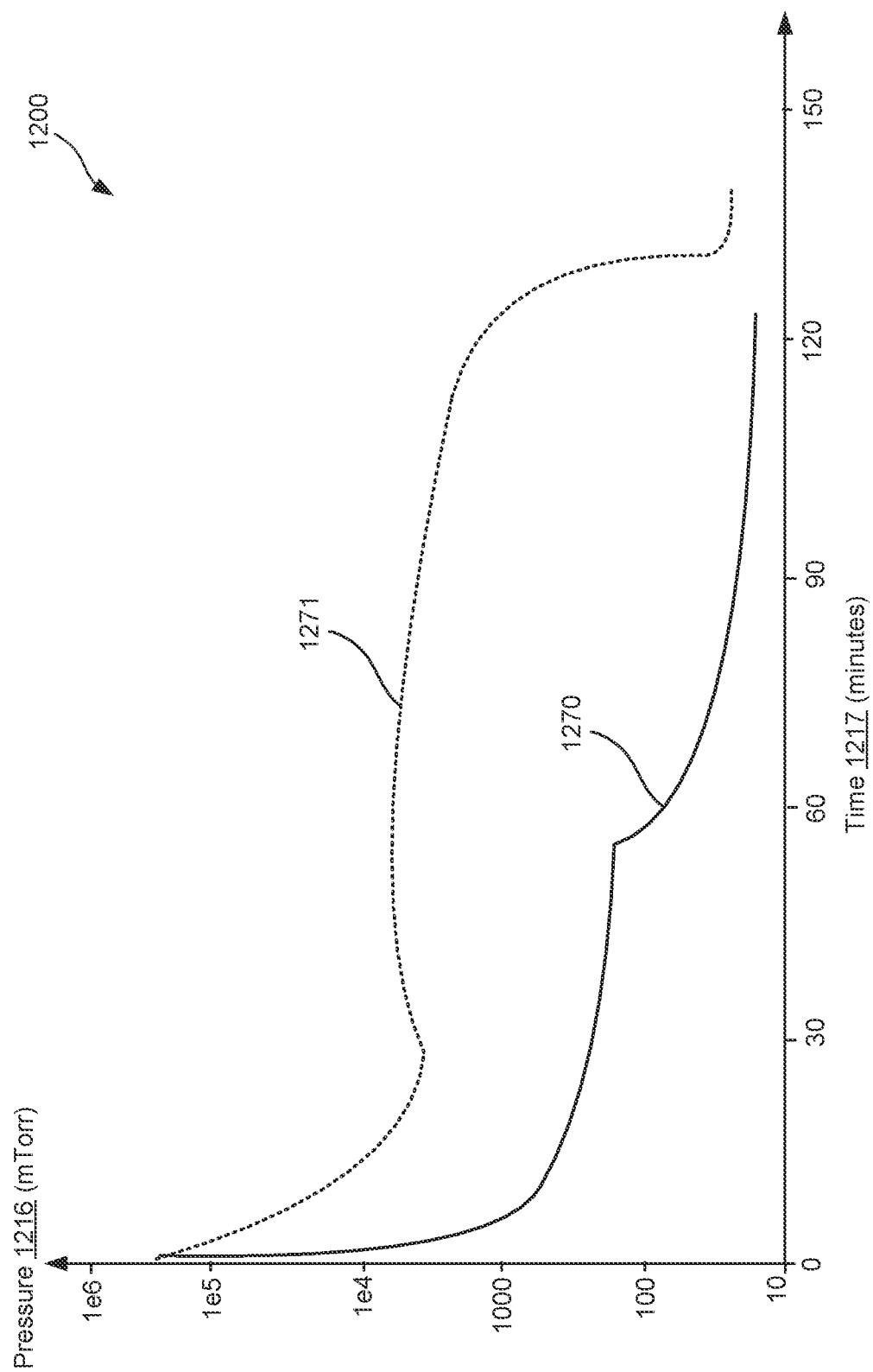
FIG. 12 illustrates a conceptual graph showing two curves of pressure against time, according to various aspects of the disclosure.

FIG. 12 illustrates a conceptual graph 1200 showing two pump down curves 1270 and 1271 of pressure 1216 against time 1217, according to various aspects of the disclosure. In this example, the pump down curves 1270 and 1271 corresponds to the pump down curves for the coating systems 1100-*a* and 1100-*b*, respectively, previously described in relation to FIGS. 11A-11B. Specifically, the pump down curve 1270 corresponds to the pump down curve for the coating system 1100-*a* utilizing a pumping system having a by-pass configuration (i.e., where the turbo pump and mechanical pump are arranged in parallel), while the pump down curve 1271 corresponds to the pump down curve for the coating system 1100-*b* utilizing a pumping system in which the turbo and mechanical pumps are arranged in series. It should be noted that, the scale on the vertical axis (or y-axis) in graph 1200 is logarithmic. As seen in FIG. 12, the pumping system of coating system 1100-*a* takes less time than the pumping system of coating system 1100-*b* to pump down the chamber pressure from 630 Torr (i.e., 630,000 mTorr) to the target pressure of 25 mTorr. In this example, the volume of the chamber (e.g., chambers 1102-*a*, 1102-*b*) was around 514 liters. FIG. 6 shows another example of a pump down curve, where the use of a bypass-configuration speeds up Phase 1 as there is minimal flow restriction due to the turbo pump when the mechanical pump is in operation.

Figure 14:
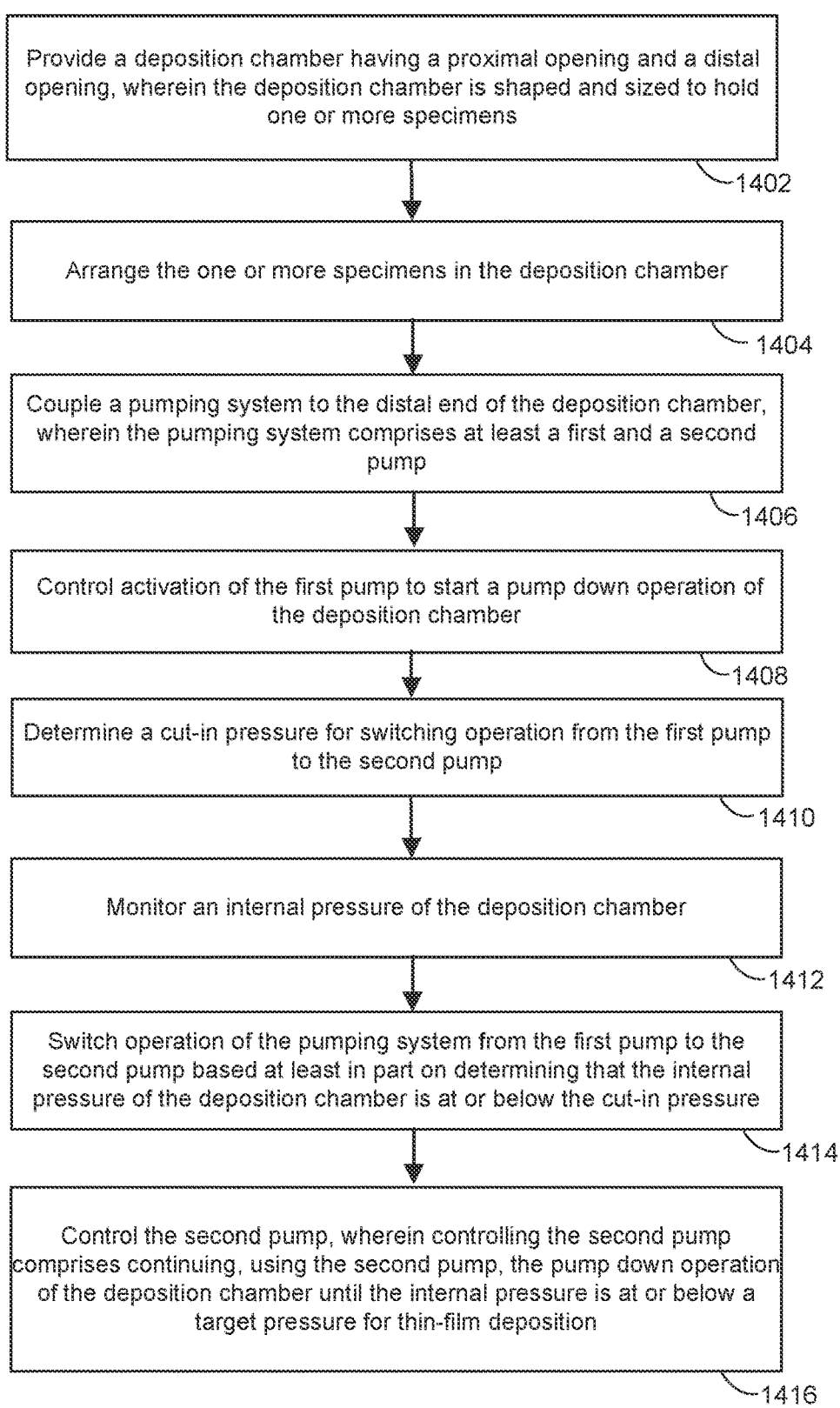
FIG. 14 illustrates an example of a method for thin-film deposition, such as parylene deposition, according to various aspects of the disclosure.

FIG. 14 illustrates an example of a method 1400 for thin-film deposition, such as, but not limited to, parylene deposition, according to various aspects of the disclosure. The method 1400 may be implemented using one or more of the coating system 100, the controller 150, the coating system 400, and/or the computing system 1300, described in relation to FIGS. 1, 4, and/or 13.

At step 1402, the method 1400 comprises providing a deposition chamber having a proximal end (or opening) and a distal end (or opening), where the deposition chamber is shaped and sized to hold one or more specimens.

At step 1404, the method 1400 comprises arranging the one or more specimens in the deposition chamber.

At step 1406, the method 1400 comprises coupling a pumping system to the distal end of the deposition chamber, where the pumping system comprises at least a first pump and a second pump. In some cases, the first pump may be an example of a mechanical pump, such as a roughing pump, described in relation to the figures above. Furthermore, the second pump may be an example of a turbo pump (or turbo molecular pump). In some embodiments, the first and the second pump may be associated with different pump down curves. For example, the first pump (e.g., roughing pump) may have a higher pumping speed when the operating pressure is at or near atmospheric pressure, at least 10 Torr, at least 100 Torr, to name a few non-limiting examples. Furthermore, the second pump (e.g., turbo pump) may be optimized for low-pressure conditions. That is, the second pump may have a higher pumping speed when the operating pressure is at or below 10 Torr, at or below 1 Torr, to name two non-limiting examples. Further details on pump down curves are described above. By utilizing a pumping system with different types of pumps (e.g., mechanical, turbo pumps) optimized for different operating pressure ranges, aspects of the disclosure facilitate in decreasing the pump down time for a deposition chamber, such as those used in parylene deposition processes.

As noted above, one or more steps of method 1400 may be implemented using a controller, such as controller 150 and/or computer system 1300 described in relation to FIGS. 1 and/or 13, respectively.

For example, at step 1408, the method 1400 comprises controlling activation of the first pump to start a pump down operation of the deposition chamber. In some embodiments, the first pump may be operated until the pressure in the deposition chamber is at or below a cut-in pressure. In some cases, at step 1410, the method 1400 comprises determining a cut-in pressure for switching operation from the first pump to the second pump. Additionally, at step 1412, the method 1400 comprises monitoring an internal pressure of the deposition chamber. The controller 150 may be configured to monitor the internal pressure of the deposition chamber in real-time or substantially real-time. In some cases, a pumping speed of each of the first pump and the second pump is based at least in part on an operating pressure. Additionally, the cut-in pressure may be determined (step 1410) based on a relation between a corresponding pumping speed for one or more of the first pump and the second pump at different operating pressures. In one non-limiting example, the cut-in pressure may be selected to be the pressure at which the first pump (e.g., mechanical pump) starts leveling out and/or the pressure at which there is a noticeable increase in the pumping speed of the second pump (e.g., turbo pump).

At step 1414, the method 1400 comprises switching operation of the pumping system from the first pump to the second pump based at least in part on determining that the internal pressure of the deposition chamber is at or below the cut-in pressure. In some cases, switching operation of the pumping system from the first pump to the second pump comprises transitioning control from a first valve coupled to the first pump to a second valve coupled to the second pump. In some cases, transitioning the control comprises closing the first valve when the internal pressure is at or below the cut-in pressure, and opening the second valve based at least in part upon closing the first valve. In some cases, the first and the second valves may be in communication with the controller 150 and configured to receive control signals 122 from the controller 150. Additionally, the first and the second valve may be configured to control the flow through the first and the second pumps, respectively, for instance, based on the control signals 122 received from the controller 150.

At step 1416, the method 1400 comprises controlling the second pump, where controlling the second pump comprises continuing, using the second pump, the pump down operation of the deposition chamber until the internal pressure is at or below a target pressure for thin-film deposition. In some embodiments, the target pressure is (1) at or below 50 mTorr, or (2) at or below 10 mTorr, or (3) at or below 2 mTorr, or (4) anywhere between 30 to 50 mTorr, or (5) in a range between 10 mTorr to 50 mTorr, to name a few non-limiting examples.

It should be noted that, the pressure ranges, types of pumps, cut-in pressure, etc., described above are not intended to be limiting. That is, different pressure ranges, types of pumps, cut-in pressure, etc., are contemplated in different embodiments, for instance, based on the type of thin-film deposition and/or use-case.

The methods described in connection with the embodiments disclosed herein may be embodied directly in hardware, in processor-executable code encoded in a non-transitory tangible processor readable storage medium, or in a combination of the two. Referring to FIG. 13 for example, shown is a block diagram depicting physical components that may be utilized to realize a controller, such as controller 150 in FIG. 1, according to an exemplary embodiment. As shown, in this embodiment a display portion 1312 and nonvolatile memory 1320 are coupled to a bus 1322 that is also coupled to random access memory ("RAM") 1324, a processing portion (which includes N processing components) 1326, an optional field programmable gate array (FPGA) 1327, and a transceiver component 1328 that includes N transceivers. Although the components depicted in FIG. 13 represent physical components, FIG. 13 is not intended to be a detailed hardware diagram; thus, many of the components depicted in FIG. 13 may be realized by common constructs or distributed among additional physical components. Moreover, it is contemplated that other existing and yet-to-be developed physical components and architectures may be utilized to implement the functional components described with reference to FIG. 13.

This display portion 1312 generally operates to provide a user interface for a user, and in several implementations, the display is realized by a touchscreen display. In general, the nonvolatile memory 1320 is non-transitory memory that functions to store (e.g., persistently store) data and processor-executable code (including executable code that is associated with effectuating the methods described herein). In some embodiments for example, the nonvolatile memory 1320 includes bootloader code, operating system code, file system code, and non-transitory processor-executable code to facilitate the execution of the methods described with reference to the figures described further herein. For instance, the nonvolatile memory 1320 may store non-transitory processor-executable code, which when executed, may cause the controller 150 to regulate the opening/closing of valves connected to the pumps (e.g., roughing pump, turbo pump(s), roots-blower type pump, etc.).

In many implementations, the nonvolatile memory 1320 is realized by flash memory (e.g., NAND or ONENAND memory), but it is contemplated that other memory types may be utilized as well. Although it may be possible to execute the code from the nonvolatile memory 1320, the executable code in the nonvolatile memory is typically loaded into RAM 1324 and executed by one or more of the N processing components in the processing portion 1326.

The N processing components in connection with RAM 1324 generally operate to execute the instructions stored in nonvolatile memory 1320 to enable opening/closing of the valves to regulate which pump (e.g., turbo pump, mechanical pump, an optional roots blower pump, etc.) is active. For example, non-transitory, processor-executable code to effectuate the methods described with reference to FIGS. 1, 2, 5A-5B, and/or 6 may be persistently stored in nonvolatile memory 1320 and executed by the N processing components in connection with RAM 1324. As one of ordinarily skill in the art will appreciate, the processing portion 1326 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1326 may be configured to effectuate one or more aspects of the methodologies described herein. For example, non-transitory processor-readable instructions may be stored in the nonvolatile memory 1320 or in RAM 1324 and when executed on the processing portion 1826, cause the processing portion 1326 to regulate the opening/closing of the valves coupled to the pumps. In some cases, the valves coupled to the pumps may be opened or closed based at least in part on the pressure in the deposition chamber. Additionally, or alternatively, non-transitory FPGA-configuration-instructions may be persistently stored in nonvolatile memory 1320 and accessed by the processing portion 1326 (e.g., during boot up) to configure the hardware-configurable portions of the processing portion 1326 to effectuate the functions of a controller, such as controller 150.

The input component 1330 operates to receive signals (e.g., the pressure in the chamber, rotation speed of turbo pump, temperature of turbo pump, to name a few non-limiting examples) that are indicative of one or more aspects of the health status of the turbo pump, the pump down curve of the pumping system, etc. The signals received at the input component 1330 may include, for example, the pressure in the deposition chamber. The output component 1332 generally operates to provide one or more analog or digital signals to effectuate an operational aspect of the valves and/or pumps. For example, the output portion 1332 may provide the valve regulation signals described with reference to FIGS. 4, 5A-5B, and/or 6. For instance, the output portion 1332 may transmit a signal to open or close one or more of the roughing valve, turbo valve(s), and/or foreline valve(s) in FIG. 4. In this way, the output portion 1332 facilitates in controlling when Phase 1 ends and Phase 2 begins in FIG. 6. Specifically, the processing portion 1326 may process the input signals, such as the chamber pressure, received by input component 1330 and determine when to initiate the turbo phase (i.e., determine when the turbo pump should take over from the roughing pump). The output portion 1332 may then send a signal that causes the roughing valve to close and the foreline and turbo valves for the corresponding turbo pump to open. In one non-limiting example, the output portion 1332 and/or the processing portion 1326 may initiate the turbo assist and coating cycle phase (e.g., Phase 2 in FIG. 6) when the pressure in the chamber is at or below the cut in pressure (e.g., anywhere between 2-10 Torr).

The depicted transceiver component 1328 includes N transceiver chains, which may be used for communicating with external devices via wireless or wireline networks. Each of the N transceiver chains may represent a transceiver associated with a particular communication scheme (e.g., Wi-Fi, Ethernet, Profibus, etc.).

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system for thin-film deposition, comprising:
   a deposition chamber configured to hold one or more specimens, wherein the deposition chamber is configured to be coupled to a furnace at a proximal end and coupled to a pumping system at a distal end, wherein the pumping system comprises:
   a first pump;
   a second pump, wherein a pumping speed of each of the first pump and the second pump is based on an operating pressure within the deposition chamber; and
   a controller, wherein the controller comprises one or more hardware processors configured by machine-readable instructions to:
   control activation of the first pump to initiate a pump down operation of the deposition chamber;
   determine a cut-in pressure for switching operation of the pump down operation from the first pump to the second pump;
   monitor an internal pressure of the deposition chamber;
   switch operation of the pumping system from the first pump to the second pump based on determining that the internal pressure of the deposition chamber is at or below the cut-in pressure, wherein the pumping speed of the second pump is higher when the internal pressure of the deposition chamber is at or below the cut-in pressure than the pumping speed of the first pump was when the internal pressure of the deposition chamber was above or at the cut-in pressure; and
   continue, using the second pump, the pump down operation of the deposition chamber until the internal pressure of the deposition chamber is at or below a target pressure.

2. The system of claim 1, wherein:
   a pumping speed of the first pump is higher than a pumping speed of the second pump when the internal pressure of the deposition chamber is at or above the cut-in pressure.

3. The system of claim 1, wherein the cut-in pressure is determined based on a relation between a corresponding pumping speed for one or more of the first pump and the second pump at different operating pressures of the first pump and the second pump.

4. The system of claim 1, further comprising:
   a vaporizer;
   wherein the furnace is a pyrolysis furnace, and wherein the pyrolysis furnace is coupled between the vaporizer and the proximal end of the deposition chamber; and
   wherein the distal end of the deposition chamber is coupled to a cold trap, the cold trap coupled between the deposition chamber and the pumping system.

5. The system of claim 4, wherein the vaporizer is configured to receive a powdered solid to be deposited as a thin-film on the one or more specimens in the deposition chamber, and wherein the vaporizer is further configured to vaporize or sublimate the powdered solid into a first vapor.

6. The system of claim 5, wherein the first vapor comprises a dimer vapor, and wherein the pyrolysis furnace is configured to heat the dimer vapor to transform the dimer vapor to a monomer vapor, wherein the monomer vapor flows into the deposition chamber, and wherein an interior of the deposition chamber is maintained anywhere between 20-25 degrees Celsius.

7. The system of claim 1, wherein the target pressure is:
   at or below 50 mTorr, or
   at or below 10 mTorr, or
   at or below 2 mTorr, or
   anywhere between 30 to 50 mTorr, or
   in a range between 10 mTorr to 50 mTorr.

8. The system of claim 1, wherein the pumping system further comprises:
   a first valve coupled to the first pump, wherein the first pump is a roughing pump, and wherein flow through the first pump is controlled using the first valve; and a second valve coupled to the second pump, wherein the second pump is a turbo pump, and wherein flow through the second pump is controlled using the second valve, wherein each of the first valve and the second valve are controlled using the controller.

9. The system of claim 8, wherein the controller is further configured to:

open the first valve to control the activation of the first pump to initiate the pump down operation;

wherein switching operation of the pumping system from the first pump to the second pump comprises transitioning control from the first valve to the second valve, wherein transitioning the control comprises:

closing the first valve when the internal pressure of the deposition chamber is at or below the cut-in pressure; and opening the second valve, in response to closing the first valve.

10. The system of claim 8, wherein the pumping system further comprises:

a third pump, wherein the third pump is a turbo pump;

wherein each of the first pump, the second pump, and the third pump are associated with different pump down curves.

11. The system of claim 1, wherein the first pump comprises a mechanical pump and the second pump comprises a turbo pump, and wherein:

the mechanical pump and the turbo pump are arranged in a parallel or by-pass configuration.

12. The system of claim 1, wherein each of the one or more specimens comprises an electrical part or wafer, and wherein the thin-film deposition comprises a parylene deposition.

13. The system of claim 1, wherein the first pump comprises a mechanical pump and the second pump comprises a turbo pump, and wherein the mechanical pump and the turbo pump are arranged in a series configuration, wherein the turbo pump is positioned between the mechanical pump and the distal end of the deposition chamber.

* * * * *